United States Patent
Haputhanthri et al.

(10) Patent No.: US 11,144,058 B2
(45) Date of Patent: Oct. 12, 2021

(54) SYSTEMS AND METHODS FOR VEHICLE POWERTRAIN CALIBRATION SELECTION STRATEGY

(71) Applicant: Ford Global Technologies, LLC, Dearborn, MI (US)

(72) Inventors: Shehan Haputhanthri, Canton, MI (US); Matthew Joseph, Saint Clair Shores, MI (US); Merwyn Cheruvathur, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 177 days.

(21) Appl. No.: 16/505,564

(22) Filed: Jul. 8, 2019

(65) Prior Publication Data

US 2021/0011475 A1    Jan. 14, 2021

(51) Int. Cl.
  *G05D 1/00* (2006.01)
  *G05D 1/02* (2020.01)
  *B60W 50/00* (2006.01)
  *G01C 21/34* (2006.01)

(52) U.S. Cl.
  CPC ........... *G05D 1/0088* (2013.01); *B60W 50/00* (2013.01); *G05D 1/0217* (2013.01); *G05D 1/0223* (2013.01); *G05D 1/0276* (2013.01); *G05D 1/0291* (2013.01); *B60W 2050/0077* (2013.01); *B60W 2050/0083* (2013.01); *G01C 21/34* (2013.01)

(58) Field of Classification Search
  CPC .. G05D 1/0088; G05D 1/0217; G05D 1/0276; G05D 1/0223; G05D 1/0291; B60W 50/00; B60W 2050/0083; B60W 2050/0077; G01C 21/34
  See application file for complete search history.

(56) References Cited

U.S. PATENT DOCUMENTS

| 8,374,781 B2 | 2/2013 | Hartman |
| 8,612,107 B2 | 12/2013 | Malikopoulos |
| 9,657,676 B2 | 5/2017 | Glauber et al. |

(Continued)

FOREIGN PATENT DOCUMENTS

| CN | 107782327 A | 3/2018 |
| DE | 102018111266 A1 | 11/2018 |

OTHER PUBLICATIONS

Malikopoulos, A. et al., "Real-Time Self-Learning Optimization of Diesel Engine Calibration," Journal of Engineering for Gas Turbines and Power, vol. 131, No. 2, Mar. 2009, Available Online Dec. 19, 2008, 7 pages.

(Continued)

*Primary Examiner* — Rodney A Butler
(74) *Attorney, Agent, or Firm* — Geoffrey Brumbaugh; McCoy Russell LLP

(57) ABSTRACT

Methods and systems are provided for selectively controlling a powertrain of a vehicle along pre-planned travel routines. In one example, a method comprises receiving a travel request at a controller of a vehicle, determining a travel route and a powertrain calibration in a mutually dependent manner from a plurality of potential travel routes and a plurality of powertrain calibrations, and operating the vehicle according to the powertrain calibration along the travel route. In this way, preferences pertaining to the travel request may be effectively met.

19 Claims, 10 Drawing Sheets

(56) References Cited

U.S. PATENT DOCUMENTS

| | | |
|---|---|---|
| 9,695,760 B2 | 7/2017 | Dufford et al. |
| 9,910,441 B2 | 3/2018 | Levinson et al. |
| 9,919,708 B2 | 3/2018 | Pallett et al. |
| 9,969,396 B2 | 5/2018 | Damman et al. |
| 10,031,521 B1 | 7/2018 | Newman |
| 2014/0277835 A1* | 9/2014 | Filev ................. G06F 17/00 701/2 |
| 2015/0224997 A1* | 8/2015 | Glugla ............... F02D 41/2441 701/54 |
| 2016/0222903 A1* | 8/2016 | Glauber ............. F02D 41/2422 |
| 2019/0265695 A1* | 8/2019 | Udagawa ............ G05D 1/0088 |
| 2020/0156435 A1* | 5/2020 | Patil .................. B60H 1/00742 |

OTHER PUBLICATIONS

Cho, Y. et al., "Optimisation of Gasoline Engines—Automation and Machine Learning Techniques in Calibration," ATZelektronik Worldwide, vol. 12, No. 3, Jun. 2017, 6 pages.

* cited by examiner

SYSTEMS AND METHODS FOR VEHICLE POWERTRAIN CALIBRATION SELECTION STRATEGY

FIELD

The present description relates generally to methods and systems for mutually coordinating selection of vehicle powertrain calibration values with selection of vehicle travel route.

BACKGROUND/SUMMARY

Engine control systems may use various calibration tables and maps to optimize engine and powertrain output as operating conditions change over a drive cycle. For example, powertrains may be calibrated to optimize different vehicle attributes including but not limited to fuel economy, emissions, performance, noise vibration and harshness (NVH), and drivability. Such calibration values may be developed in laboratory settings to meet predetermined Environmental Protection Agency (EPA) rules, and may then be loaded into an engine control unit (ECU) of a vehicle. Once finalized, such values may not be changed for an entire lifetime of the vehicle in some examples.

As a specific example in the context of fuel economy, Environmental Protection Agency (EPA) regulations require vehicle manufacturers to run five cycle fuel economy tests and meet certain fuel economy and emissions targets. A common calibration variable set may be developed for all five cycles in the lab, and the values may then be loaded into the engine control unit. Because the calibration variable set has to cater to all five cycles, many tradeoffs may occur for individual cycles, which may thus prevent an optimal solution for each individual cycle.

Thus, such pre-calibrated values may not always be desirable for different aspects of vehicle operation. One particular example relevant to the present disclosure includes vehicles participating in vehicle-for-hire services (e.g. vehicle-sharing services, ride-hailing services, ride-sharing services), where a wide variety of different travel routes and customer demands may often render such pre-calibrated values non-optimal.

U.S. Pat. No. 9,657,676 discloses methodology for calibrating powertrain output in a vehicle that includes displaying a multi-parameter powertrain calibration map on a display device, and in response to user input, selectively adjusting the displayed calibration map along at least one parameter so as to optimize a vehicle powertrain system according to user needs and/or preferences. However, the inventors herein have recognized potential issues with such a method. As one example, a user may not always be present in a vehicle, as may be the case with autonomously operated vehicles, and thus such methodology may not be applicable to such vehicles. In the case of autonomously operated vehicles participating in a vehicle-for-hire service, customers may not feel comfortable adjusting vehicle parameters, or may find such action too burdensome to bother with. Yet even if a vehicle participating in a vehicle-for-hire service includes a driver, it may be challenging and unintuitive to a driver of the vehicle to constantly be adjusting powertrain calibration in response to a wide variety of customer travel requests.

The inventors have recognized the above-mentioned issues, and have herein developed systems and methods to at least partially address them. In one example, a method comprises receiving a travel request at a controller of a vehicle, coincidentally determining a travel route and a powertrain calibration for the travel route in a mutually dependent manner from a plurality of potential travel routes and a plurality of powertrain calibrations, and operating the vehicle according to the powertrain calibration along the travel route. In this way, the vehicle controller may determine an appropriate powertrain calibration and travel route pair for meeting the travel request without relying on a vehicle operator to choose an appropriate powertrain calibration and travel route combination.

As one example, the vehicle may be part of a vehicle-for-hire program where the travel request is communicated to the controller by way of a fleet management system that receives the travel request from a customer. The travel request may include a starting location and an ending destination. The travel request may additionally include one or more preferences including but not limited to fuel economy, vehicle performance, ride quality and emissions. Thus, coincidentally determining the travel route and the powertrain calibration in the mutually dependent manner may include accounting for the starting and ending locations along with the one or more preferences pertaining to the travel request. In this way, appropriate powertrain calibrations and travel route combinations may be determined for vehicles associated with a wide variety of travel routes and related user preferences. By appropriately pairing powertrain calibrations and travel routes, customer satisfaction may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
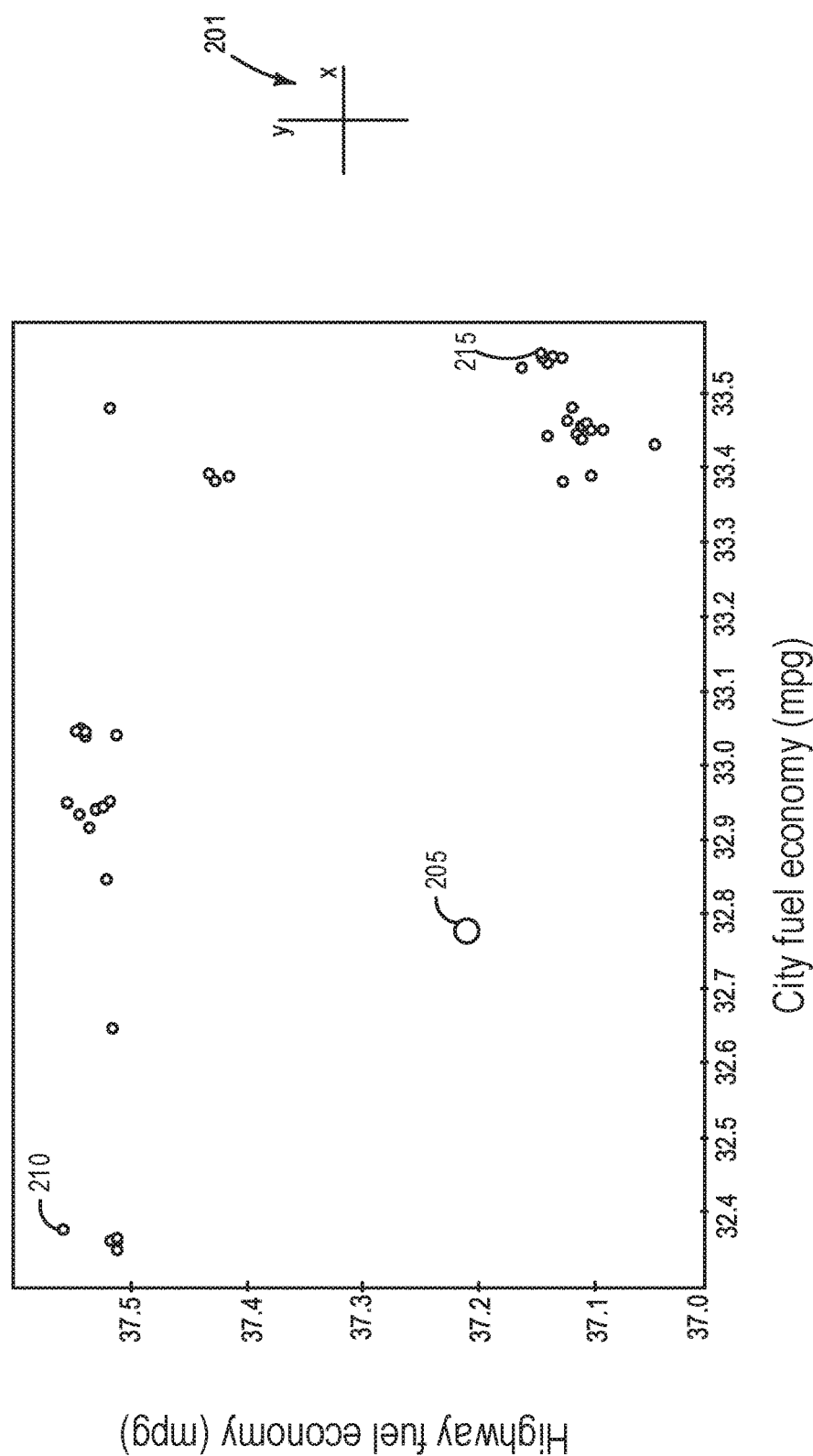
FIG. 2 depicts an example graph showing a plurality of different powertrain calibrations pertaining to different fuel economies.
Figure 3:
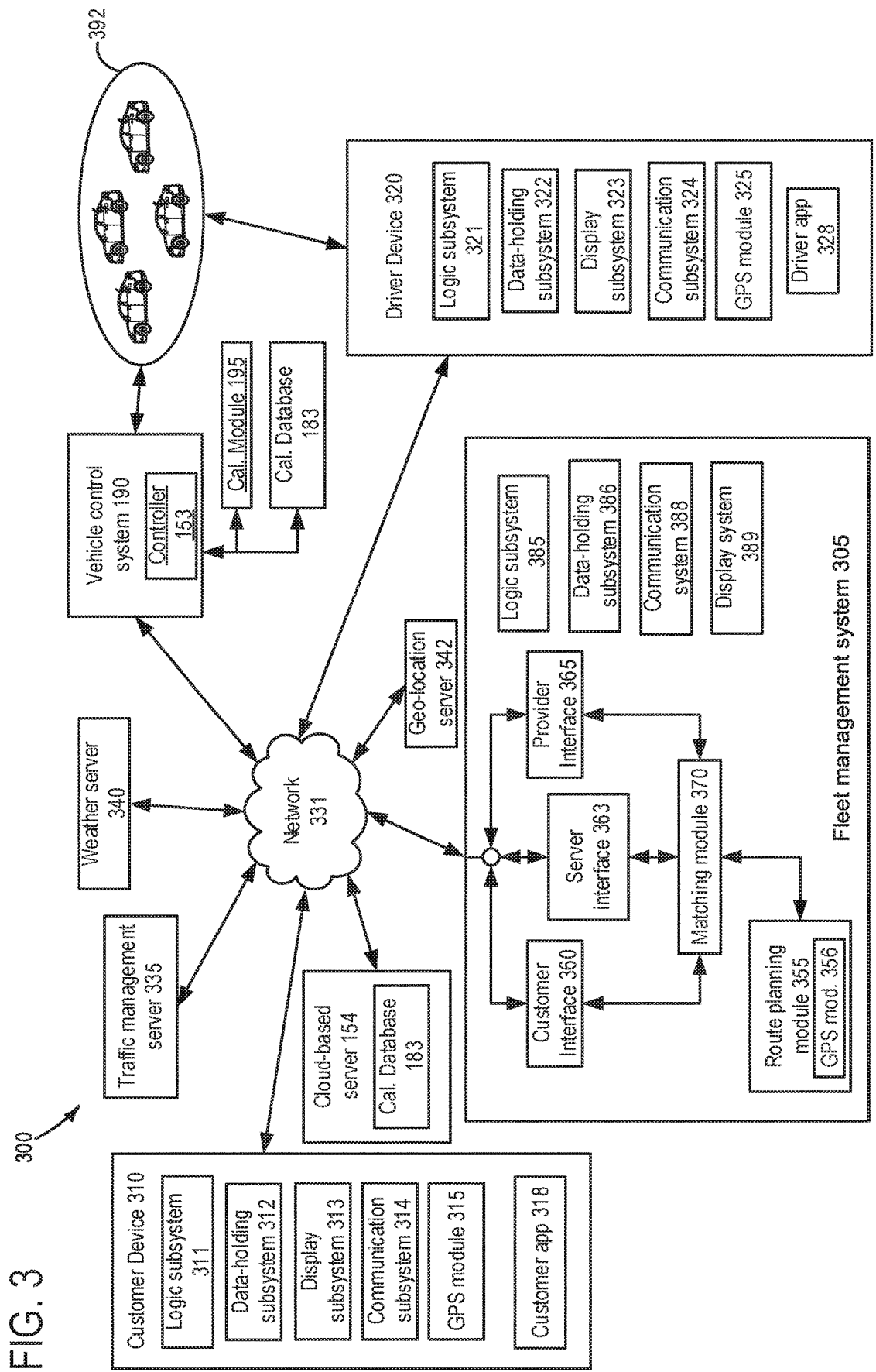
FIG. 3 shows a transportation facilitation system for use in managing a fleet of vehicles.

The following description relates to systems and methods for improving vehicle operating parameters or attributes by selecting particular powertrain calibration and travel route combinations based on a mutually dependent comparison of a plurality of powertrain calibrations and a plurality of potential travel route options. In this way, both a powertrain calibration and a travel route may be determined in a manner whereby the powertrain calibration is appropriate for the travel route corresponding to a particular travel request and vice versa. The systems and methods discussed herein relate to vehicle propulsion systems such as the vehicle propulsion system of FIG. 1, where the vehicle propulsion system may in some examples comprise an autonomously operated propulsion system. An illustrative example of different powertrain calibrations corresponding to different fuel economies for city driving vs highway driving is depicted at FIG. 2. Discussed herein, the ability to select particular powertrain calibrations depends on advance knowledge of at least starting location and ending location for particular travel routines. In one example, such information may be included in a travel request input to a software application by a customer requesting transportation via a vehicle participating in a vehicle-for-hire service. Accordingly, a transportation facilitation system that is used for managing a fleet of vehicles participating in a vehicle-for-hire service is depicted at FIG. 3.

Figure 4:
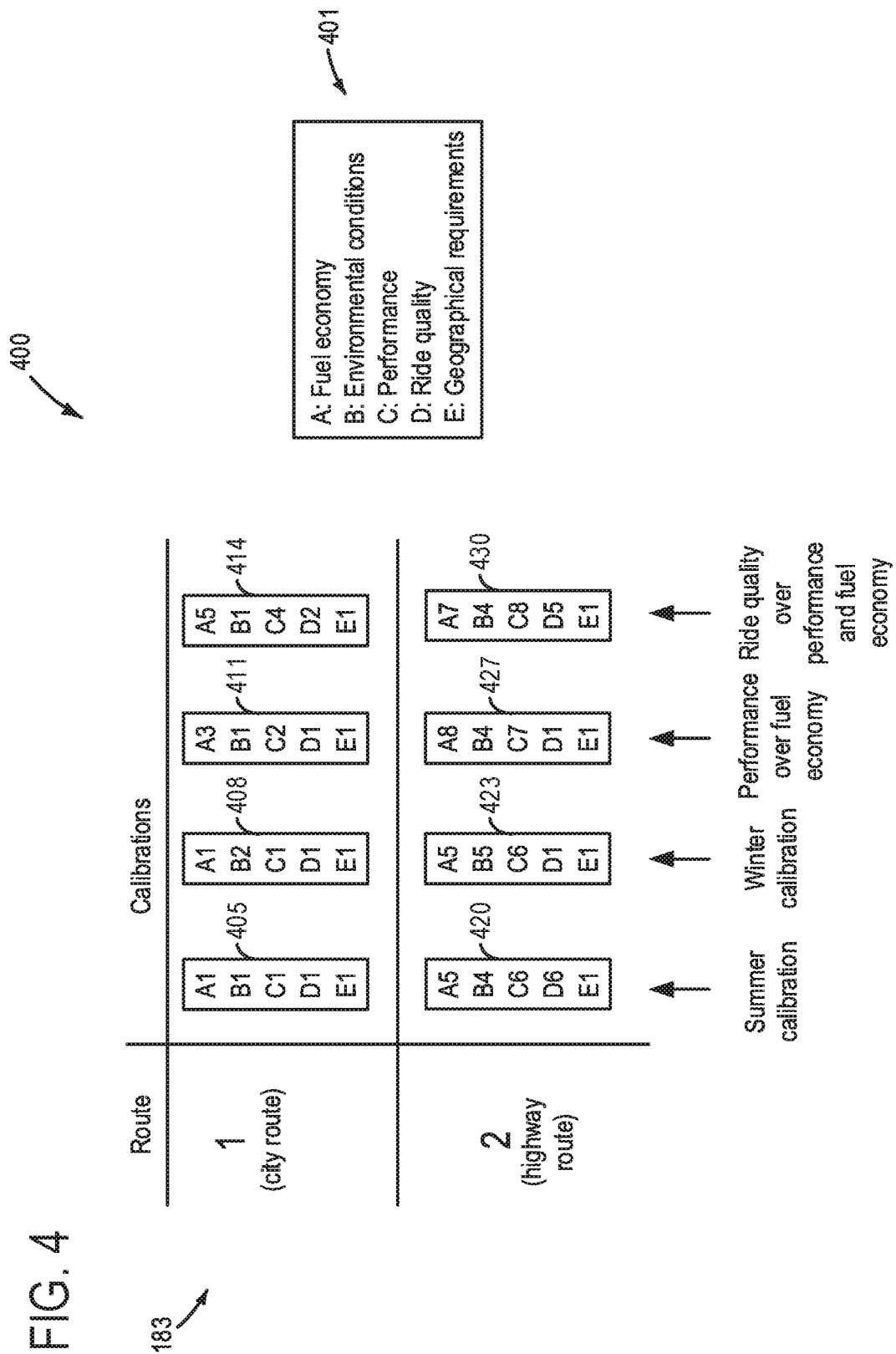
FIG. 4 depicts an example illustration of a type of data stored at a powertrain calibration database.
Figure 5:
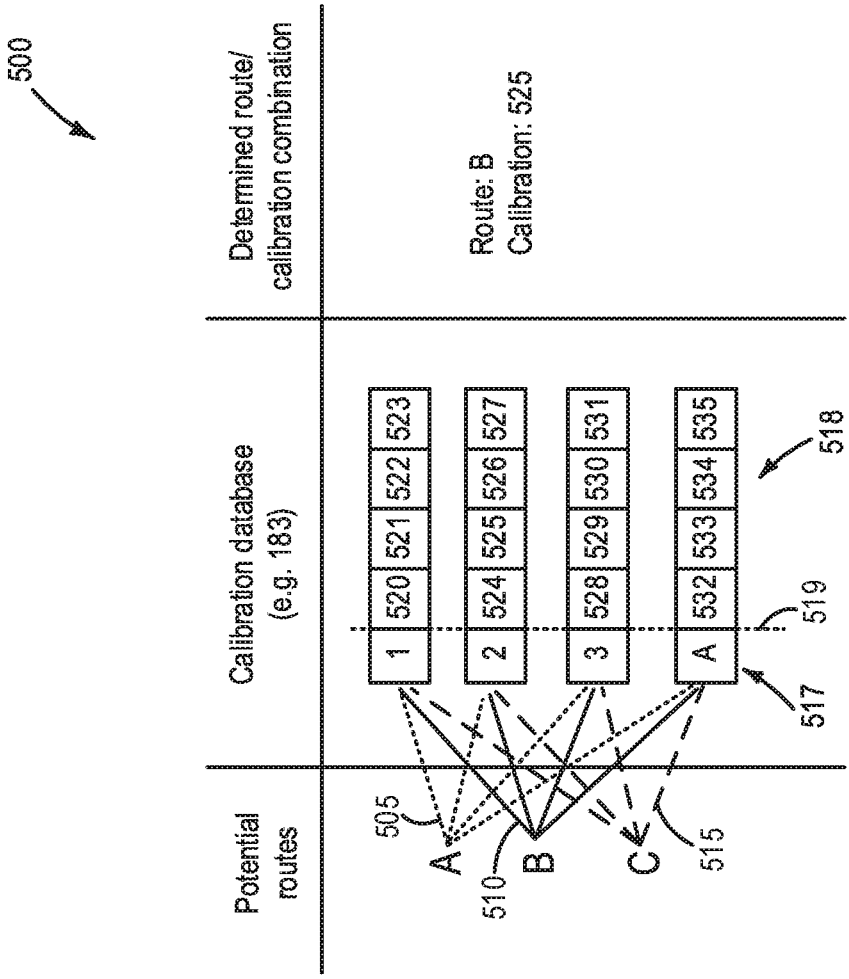
FIG. 5 depicts an illustrative example of how a particular powertrain calibration is mutually determined together with a particular travel route.

The ability to select particular powertrain calibrations as per the present disclosure depends on a controller of a vehicle having access to any number of different powertrain calibration options that are associated with particular travel routes and/or types of travel routes. Accordingly, an example of a type of data stored at a powertrain calibration database is depicted at FIG. 4. FIG. 5 illustratively depicts an example methodology for how a particular powertrain calibration and travel route may be determined in a mutually dependent fashion. In other words, FIG. 5 illustratively depicts a process whereby a travel route and a particular powertrain calibration can be determined together, where the travel route selected is based on the powertrain calibration and where the powertrain calibration is selected as a function of the travel route as well.

Figure 6:
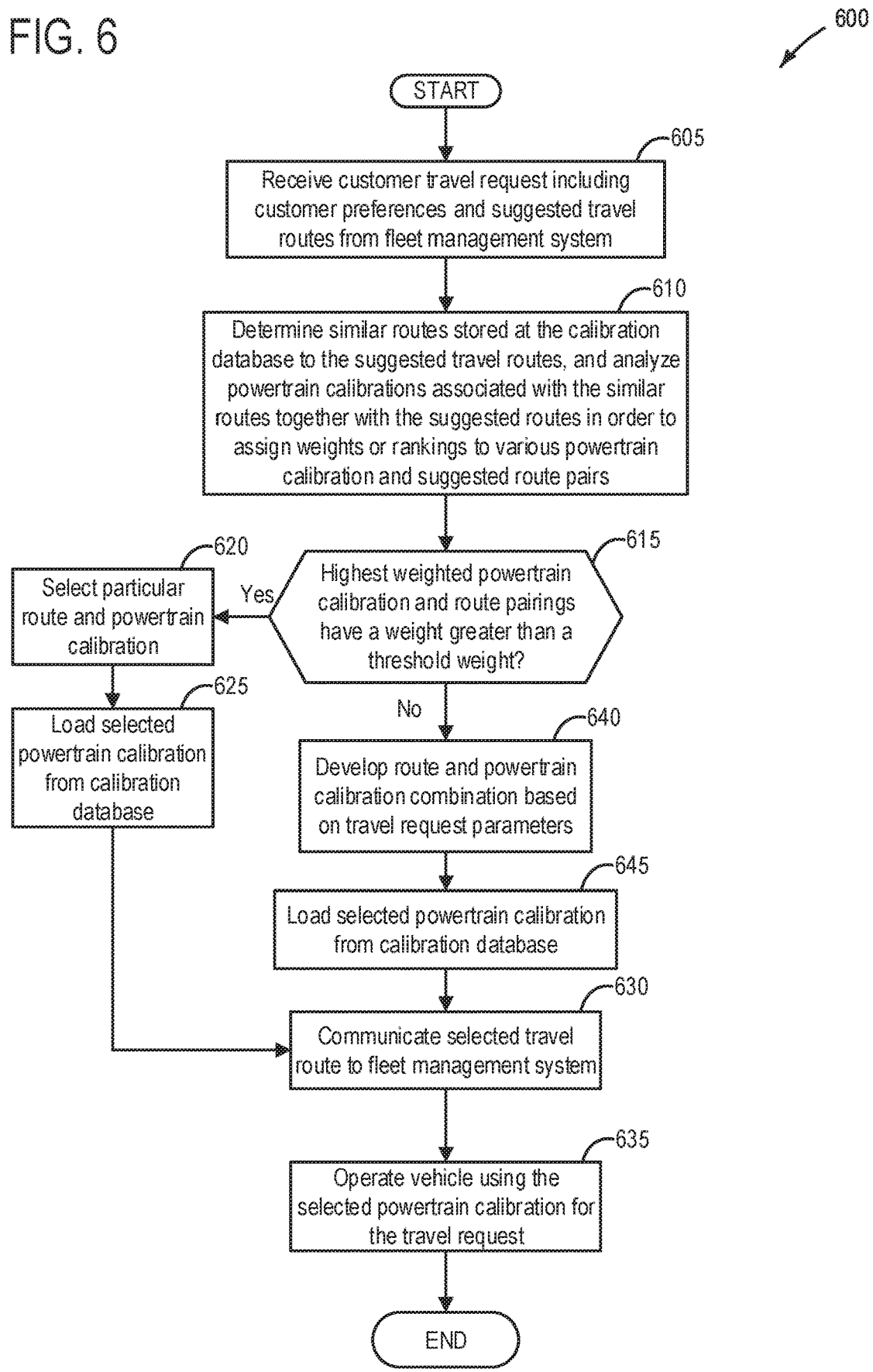
FIG. 6 depicts a high-level example method for pairing a powertrain calibration with a route for a vehicle participating in a vehicle-for-hire service.
Figure 7:
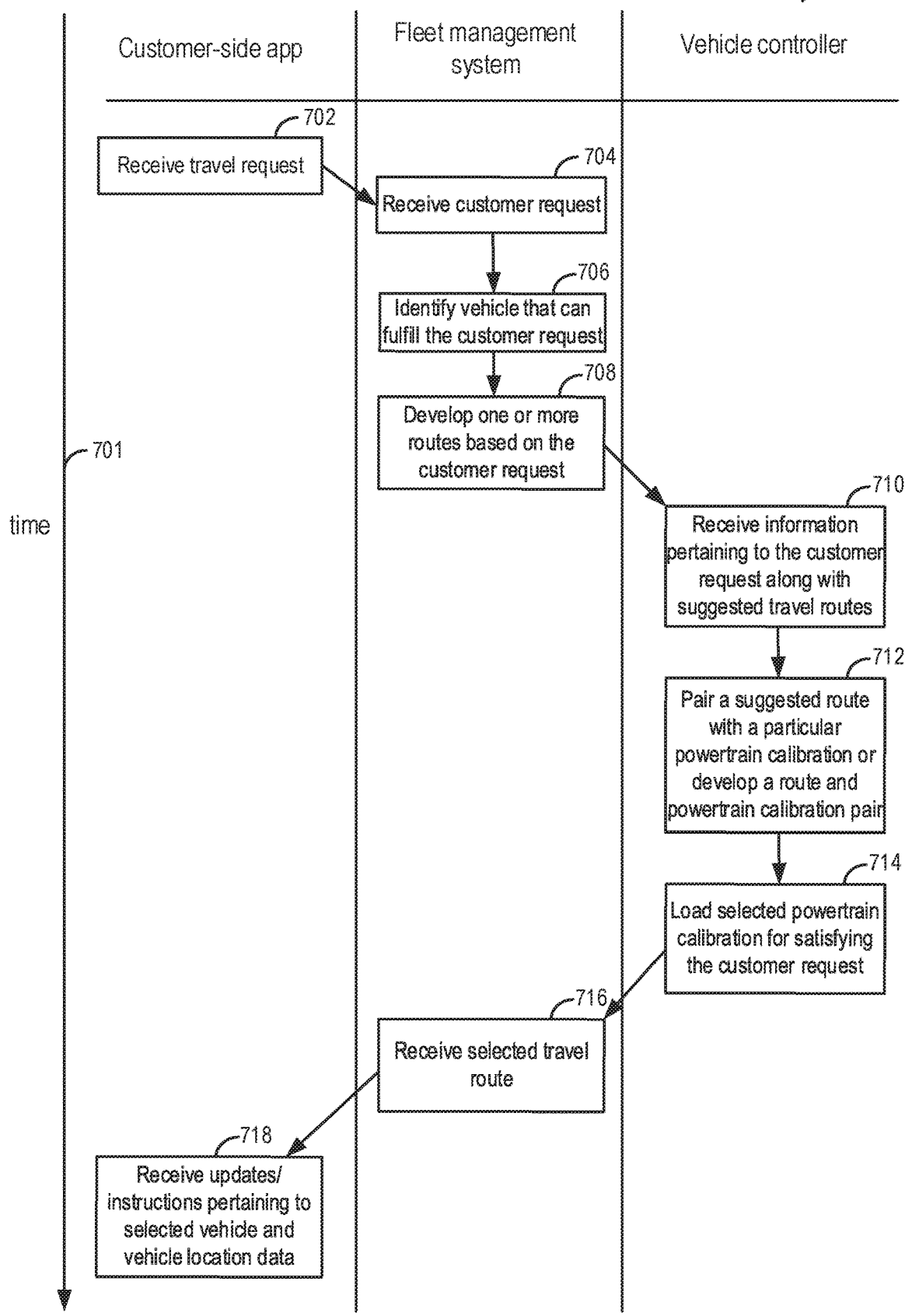
FIG. 7 depicts a communication timeline that illustrates a flow of communication between various entities as per the method of FIG. 6.
Figure 8:
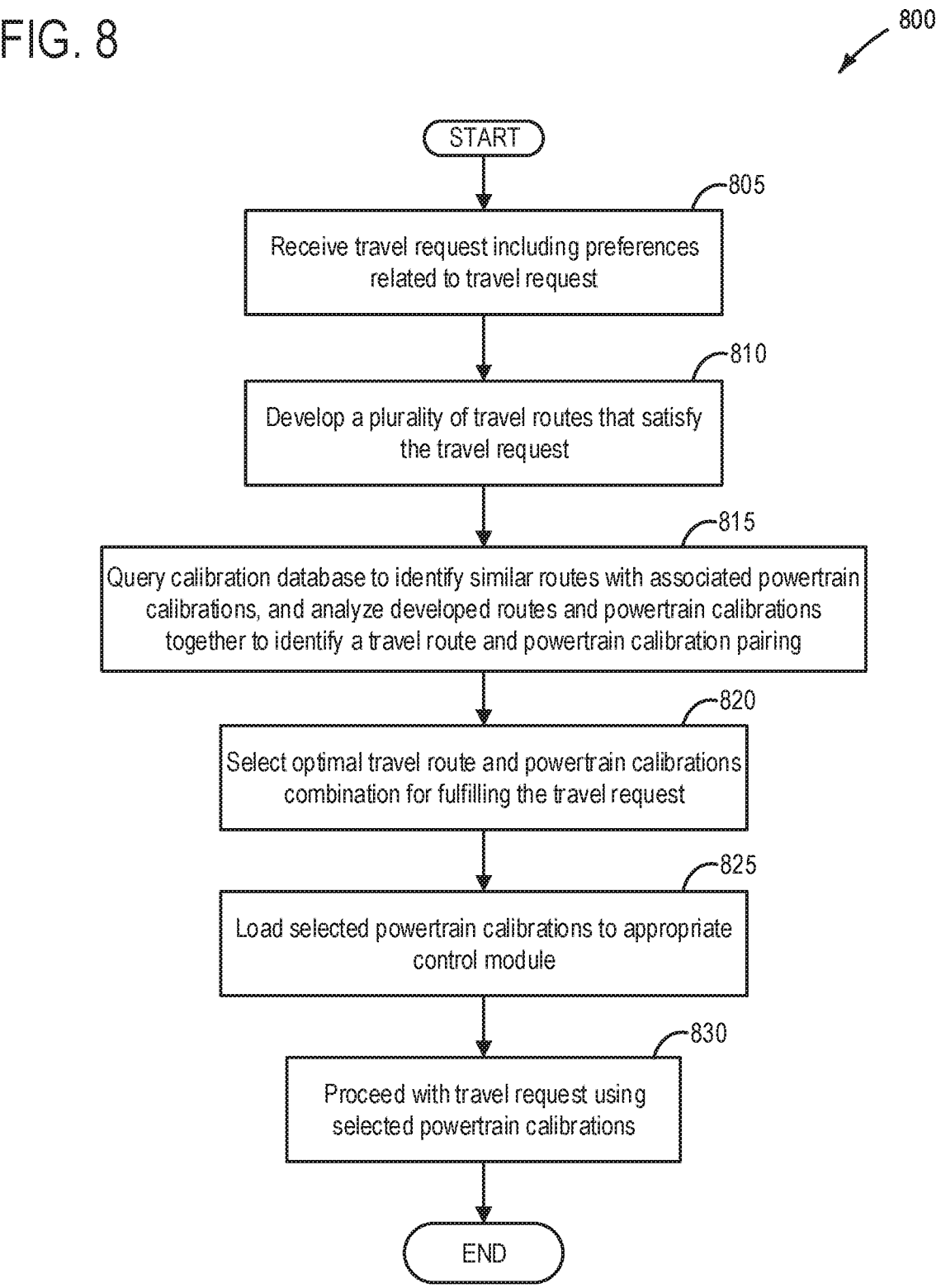
FIG. 8 depicts a high-level example method for pairing a powertrain calibration with a route under conditions where the vehicle is not part of a vehicle-for-hire service.

A method for determining a powertrain calibration and travel route pairing when a travel request is for transportation via a vehicle participating in a vehicle-for-hire service, is depicted at FIG. 6. An example communication timeline depicting a flow of communication between various entities for carrying out the method of FIG. 6 is depicted at FIG. 7. Alternatively, FIG. 8 depicts an example method for determining a powertrain calibration and travel route combination under circumstances where the vehicle desired for transportation is not part of a vehicle-for-hire service.

Figure 9:
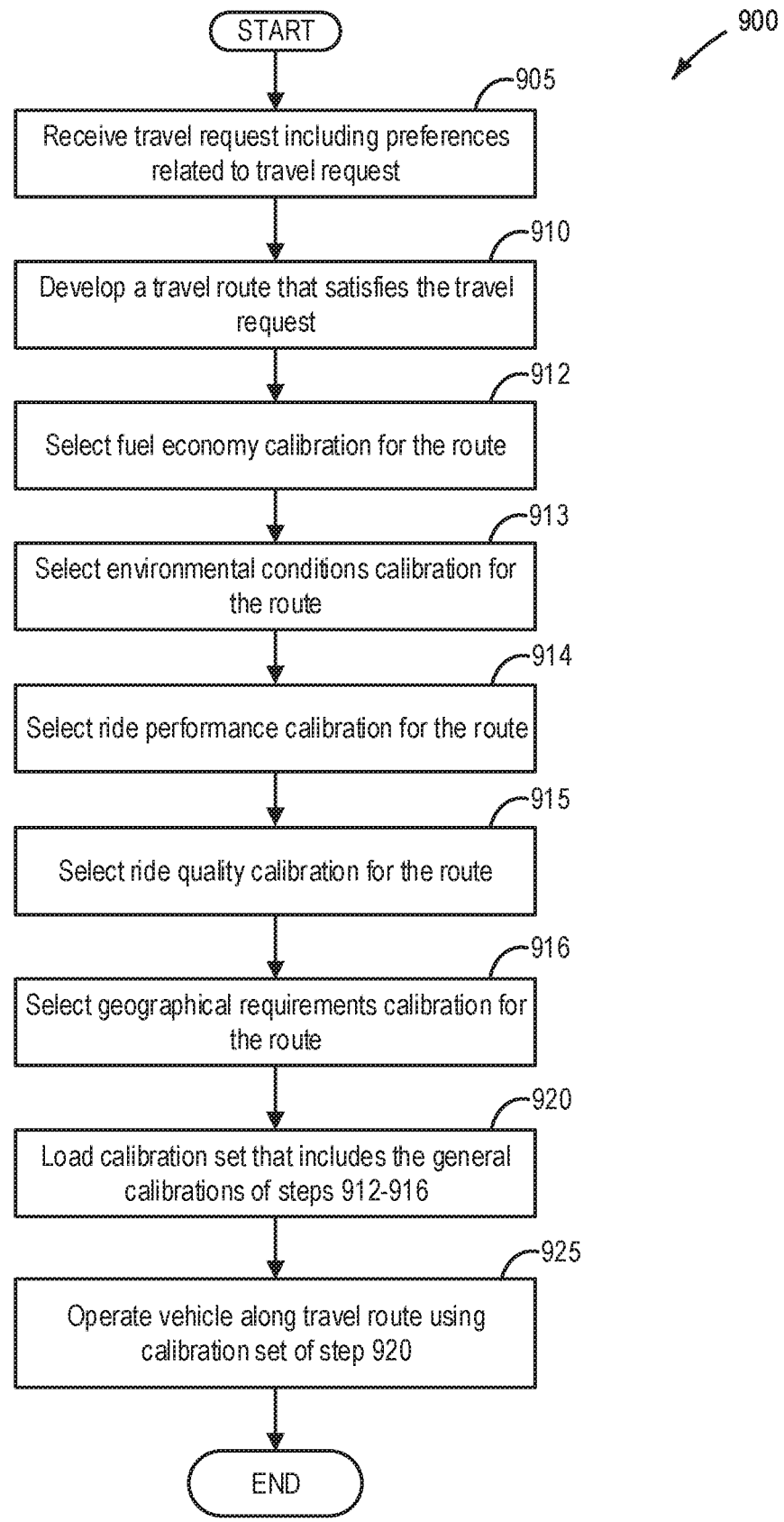
FIG. 9 depicts a high-level example method for generating a new powertrain calibration for a travel routine.
Figure 10:
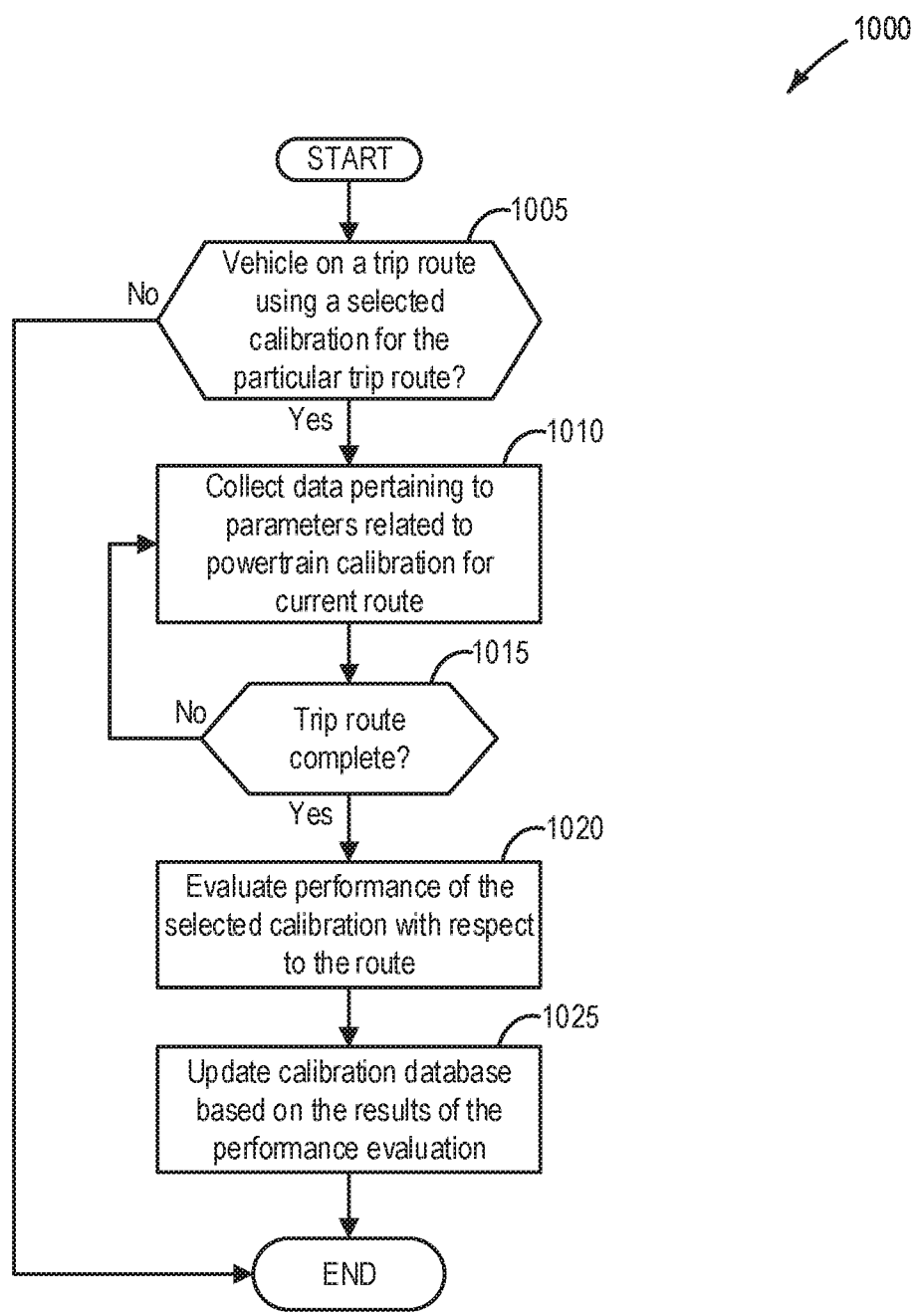
FIG. 10 depicts a high-level example method for collecting and analyzing data corresponding to particular vehicle powertrain calibrations and travel routine combinations.

As discussed above, a powertrain calibration database may store any number of powertrain calibrations, which may be associated with particular travel routines. Such powertrain calibrations may be used to determine powertrain calibration and travel routine combinations as discussed. However, there are circumstances where it is desirable to generate a powertrain calibration that is not currently stored at the calibration database. Accordingly, a method for generating a powertrain calibration is depicted at FIG. 9. A method for analyzing an effectiveness of particular powertrain calibration and travel routine combinations is depicted at FIG. 10.

Figure 1:
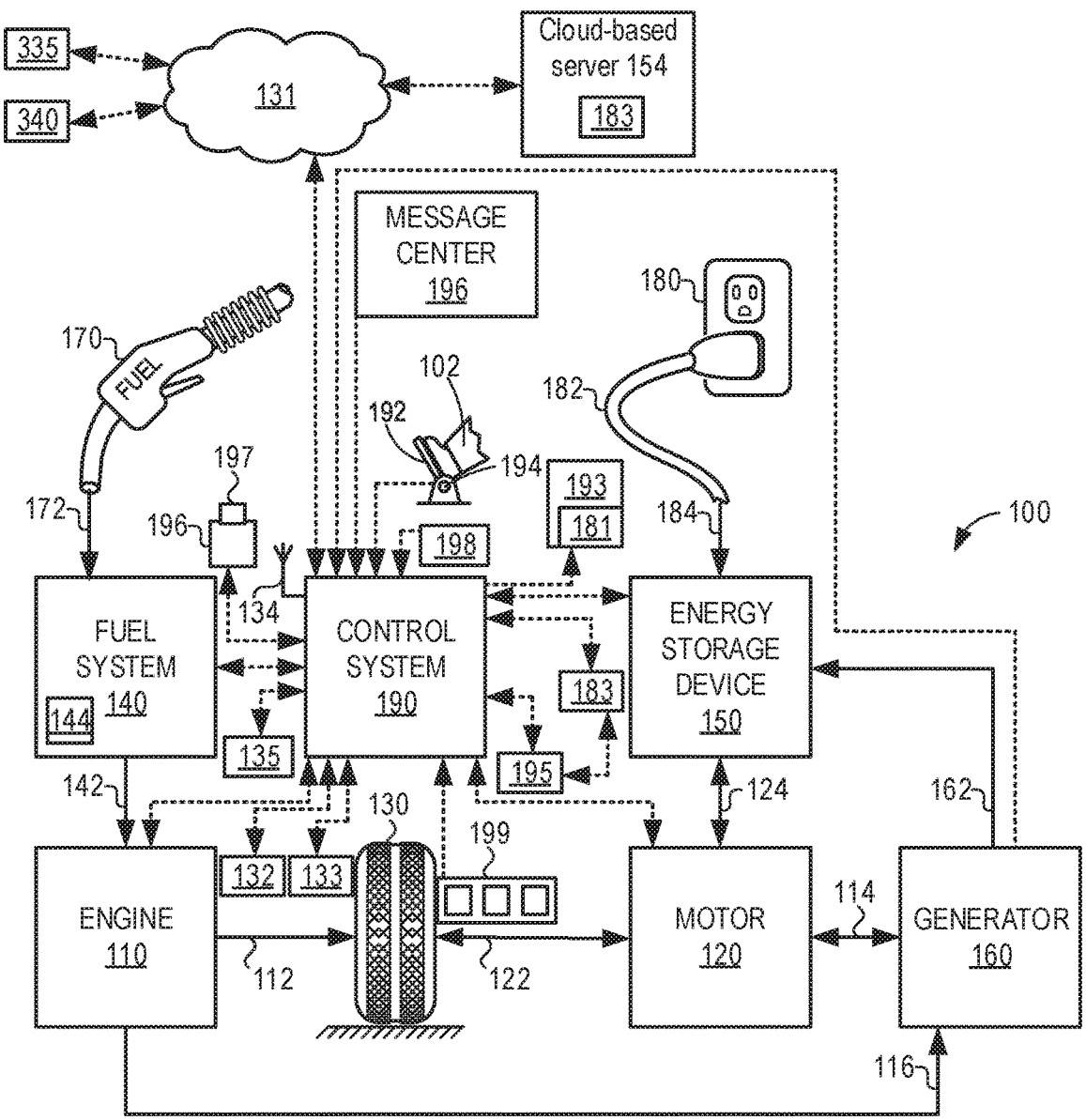
FIG. 1 shows a high-level block diagram illustrating an example vehicle propulsion system.
Figure 1:
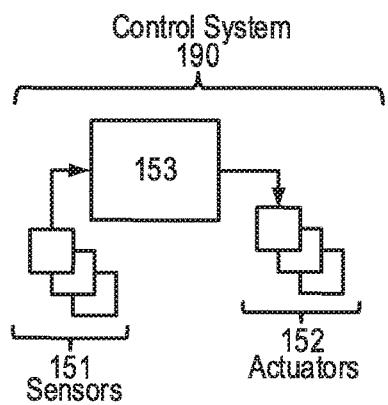

Turning now to the figures, FIG. 1 illustrates an example vehicle propulsion system 100 for use with the systems and methods of the present disclosure. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV). However, while vehicle propulsion system 100 is depicted as a HEV, it may be understood that in other examples vehicle propulsion system 100 may not be a HEV, without departing from the scope of this disclosure. For example, vehicle propulsion system 100 may in other examples be a non-hybrid powered via gasoline or diesel fuel, or in still other examples may be a battery electric vehicle (BEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include a fuel tank 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of at least engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

As depicted, controller 153 may comprise a portion of a control system 190. Controller 153 is shown receiving information from a plurality of sensors 151 and sending control signals to a plurality of actuators 152. As an example, engine 110 may include a plurality of different engine system actuators 111 for controlling various parameters of engine operation. Examples may include but are not limited to an air intake throttle, one or more fuel injectors for providing fuel to engine cylinders, one or more spark plugs for providing spark to engine cylinders, an intake air compressor (e.g. for boosted engine operation), an exhaust gas recirculation valve for controlling an amount of exhaust gas recirculation, etc.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

In some examples, a touch screen associated with the vehicle instrument panel may display information which may allow for a vehicle operator or customer to input preferences pertaining to travel requests including but not limited to starting and ending locations, fuel economy, vehicle performance, ride quality, emissions, etc., as will be elaborated in further detail below.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle (or autonomous controller) may interact with. The navigation system 132 may include one or more location sensors for assisting in estimating vehicle speed, vehicle altitude, vehicle position/location, etc. As discussed above, control system 190 may further be configured to receive information via the internet or other communication networks. Accordingly, a vehicle wireless communication device 134 is depicted as coupled to control system 190. Information received from the GPS may be cross-referenced to information available via the internet to determine local weather conditions, local vehicle regulations, etc. In some examples, vehicle system 100 may include one or more of lasers, onboard cameras, radar, sonar, and/or acoustic sensors 133, which may enable vehicle location, traffic information, etc., to be collected via the vehicle. As will be elaborated in further detail below, in the case where vehicle propulsion system is autonomously operated, sensors 133 may be used to aid in navigation.

Accordingly, in some examples vehicle propulsion system 100 may be operated autonomously via autonomous control system 193, which may communicate with control system 190 and other components of vehicle propulsion system 100. Autonomous control system 193 may include an autonomous controller 181, for example. Autonomous control system 193 may receive information from on-board navigation system 132, where the navigation system may be configured to determine a current location of the vehicle using, for example, a GPS receiver configured to triangulate the position of the vehicle relative to satellites or terrestrial-based transmitter towers. Navigation system 132 may be further configured to develop routes from a current location to a selected destination, as well as display a map and present driving directions to the selected destination via, for example, message center 196. The autonomous control system 193 may be guided in navigating the vehicle via the sensors 133, which may include lasers, onboard cameras, radar, sonar, acoustic sensors, etc. Additionally or alternatively, the autonomous control system 193 may be guided in navigating the vehicle via V2X communications with other vehicles or infrastructures, as described above. In this way, based on information retrieved from sensors (e.g. 132, 133) and V2X communications, the autonomous controller may "see" the roadway and vehicle surroundings, to enable navigation and avoidance of various obstacles while operating in autonomous mode. The autonomous control system may further be configured to control one or more subsystems (not specifically shown) including but not limited to a brake subsystem, a suspension subsystem, a steering subsystem, and a powertrain subsystem. The autonomous control system may control any one of these subsystems by outputting signals to control units associated with such subsystems. Such signals or commands may cause the subsystems to operate in accordance with driving characteristics associated with a particular driving mode (e.g. selectable driving mode), or certain passenger preferences. For example, such driving characteristics may include how aggressively the vehicle accelerates and decelerates, how much space the vehicle leaves behind a front vehicle, how frequently the autonomous vehicle changes lanes, etc.

In some examples, vehicle propulsion system 100 may include route-learning module 135. Route-learning module 135 may be used to learn commonly traveled routes of the vehicle over time, for example. Briefly, while the vehicle is in operation route-learning module 135 may continuously collect data from various sensor systems described herein (e.g. 132, 199, 133), as well as other feedback signals including but not limited to tire pressure sensors, engine temperature sensors, brake heat sensors, brake pad status sensors, tire tread sensors, fuel sensors, oil level and quality sensors, air quality sensors, engine knock sensors, etc. In this way, commonly traveled routes may be learned over time. Routes that are not commonly traveled may periodically be forgotten, so as not to amass an exorbitant amount of data over time. As a non-limiting example, data pertaining to vehicle travel routines may be applied to an algorithm that feeds into one or more machine learning algorithms to determine common vehicle travel routes. In some examples, route-learning module 135 may be used at least in part to assist in evaluation of particular powertrain calibrations along particular travel routines.

In some examples, vehicle propulsion system 100 may include a powertrain calibration database 183. Powertrain calibration database 183 may include any number of powertrain calibrations. As examples, powertrain calibrations may include powertrain calibrations relevant to fuel economy, differing environmental conditions (e.g. different calibration values for winter as compared to summer, different calibration values for certain weather conditions as compared to others, etc.), performance-related calibrations (e.g. parameters related to vehicle acceleration and deceleration, driving aggressiveness, etc.), ride-quality calibrations (e.g. parameters related to noise, vibration and harshness), geo-location centered powertrain calibrations (e.g. calibrations dependent on particular geographical location), etc.

In some examples, powertrain calibration database 183 may include correlations or associations between particular travel routes and particular powertrain calibrations. In other words, in some examples powertrain calibration database 183 may include one or more potential powertrain calibrations specific to a particular route or particular type of route (e.g. city route, highway route, uphill route, etc.). Such associations between powertrain calibration and travel route may in one example be developed manually (e.g. in a lab setting) and stored at powertrain calibration database 183. In a case where such associations between powertrain calibration and travel route are developed manually, it may be understood that such associations may relate to particular type of travel route, and may not necessarily be associated with a specific geographical travel route. As an example, a particular calibration may be associated with highway driving, while another calibration may be associated with city driving. As another example, a particular calibration may be associated with travel routines that include uphill travel (e.g. a threshold amount of elevation increase), while other calibrations may be associated with travel routines essentially devoid of uphill travel. Such examples are meant to be illustrative.

Additionally or alternatively, in other examples calibration database 183 may include associations between powertrain calibrations and particular travel routines that are learned over time, via, for example, machine learning methodology or artificial intelligence methods. In an example where such associations between powertrain calibration and travel routes are learned over time, vehicle propulsion system 100 may include powertrain calibration module 195. Powertrain calibration module 195 may, for example, be used to optimize powertrain calibrations for particular routes in association with information retrieved via route learning module 135 and/or onboard navigation system 132. In some examples, powertrain calibration module 195 may be used to assist in developing one or more powertrain calibrations for each particular route, pertaining to different aspects of powertrain control. As an example, for a particular route, powertrain calibration module 195 may be used to assist in developing a calibration or calibrations for optimizing fuel economy. For such a route, powertrain calibration module 195 may additionally or alternatively be used to assist in developing a calibration or calibrations related to vehicle performance. Additionally or alternatively, for such a route, powertrain calibration module 195 may be used to assist in developing a calibration or calibrations for various levels of NVH. Additionally or alternatively, for such a route, powertrain calibration module 195 may be used to assist in developing a calibration pertaining to meeting emissions requirements along the route. Such examples are meant to be illustrative, and other example powertrain calibrations are encompassed by the present disclosure.

In the example case where powertrain calibrations are developed over time based at least in part on information retrieved from the route learning module and/or onboard navigation system, associations or correlations between particular routes and particular powertrain calibrations may be stored at powertrain calibration database 183. In some examples, powertrain calibration database 183, or some of the data associated with powertrain calibration database 183 may be stored at cloud-based server 154. In such an example, vehicle controller 190 may query or retrieve data from the powertrain calibration database 183 over network 131.

In some examples, powertrain calibration database 183 may store information pertaining to powertrain calibrations and associated travel routines from any number of vehicles. In such an example, powertrain calibrations and associated travel routines may be organized at powertrain calibration database 183 by vehicle type (e.g. SUV vs sedan) and/or vehicle make/model. In this way, powertrain calibration data from any number of vehicles may be used to populate the powertrain calibration database.

It may be understood that, discussed herein, the powertrain calibration database 183 may be particularly useful to vehicles for which a travel routine is known ahead of time, such that an optimal or appropriate powertrain calibration for the particular travel routine may be utilized. For example, in the case of an autonomously-operated vehicle participating in a vehicle-for-hire service, a customer may input a desired travel request including at least a starting and ending location along with customer preferences (e.g. preferences related to service cost, fuel economy, emissions, comfort, performance, whether the customer is in a hurry, etc.) into a software application communicably coupled to the vehicle control system 190. As will be elaborated in greater detail below, in some examples, the controller may develop a plurality of potential routes (in some examples in conjunction with onboard navigation system 132) between the starting location and the ending destination, and may mutually determine a travel route and powertrain calibration pair based on data stored at the powertrain calibration database that accounts for variables pertaining to customer preferences related to the travel request. In such an example, the controller may utilize information retrieved from one or more of traffic management server 335 and weather server 340, discussed in further detail below at FIG. 3.

It may be understood that such methodology may not be limited to autonomously operated vehicles participating in a vehicle-for-hire service. For example, a particular user may own an autonomously operated vehicle, and may provide starting and ending location data along with customer preferences to the autonomous controller in similar fashion as that described above for an autonomous vehicle participating in a vehicle-for-hire service.

Furthermore, in some examples such methodology may be applicable to vehicles that are not autonomously-operated. For example, the methodology discussed herein may apply to any vehicle with a control system capable of receiving information pertaining to desired starting and ending location and operator/passenger/customer preferences, such that a plurality of travel routes may be developed and compared to powertrain calibrations and associated travel routines stored at the powertrain calibration database in order to optimize powertrain calibration as a function of the desired starting and ending location and operator/passenger preferences.

Discussed herein, a system for a vehicle may comprise a powertrain calibration database that stores a plurality of travel routes and associated powertrain calibrations. The system may include a controller with computer readable instructions stored on non-transitory memory that when executed, cause the controller to receive a transportation request, determine a plurality of potential travel routes for the transportation request, identify a subset of travel routes from the plurality of travel routes that are similar to the plurality of potential routes, compare powertrain calibrations corresponding to the subset of travel routes with each of the plurality of potential travel routes in order to mutually assign a ranking to powertrain calibration and travel route pairs, select a powertrain calibration and a travel route based on the ranking, and operate the vehicle via the powertrain calibration along the travel route.

For such a system, the system may further comprise a route learning module. In such an example, the controller may store further instructions to update the powertrain calibration database based on information related to travel routines and associated powertrain calibrations learned over time in conjunction with the route learning module.

For such a system, the system may further comprise an onboard navigation system. In such an example, the controller may store further instructions to develop the plurality of potential travel routes based on the travel request and in conjunction with the onboard navigation system.

For such a system, the system may further comprise an autonomous control system that may be used for autonomously operating the vehicle along the travel route.

For such a system, the system may further comprise a software application that receives the transportation request, the transportation request including a starting location and an ending location along with one or more preferences related to the transportation request. In such an example, the controller may store further instructions to receive the transportation request from the software application. As mentioned above, under circumstances where common or base calibration(s) are developed, many tradeoffs may occur with regard to different travel scenarios due to the fact that the base calibration(s) may have to meet requirements (e.g.

emissions requirements) for a wide variety of different travel scenarios. To illustrate the point, FIG. 2 depicts an example graph 200, showing forty different powertrain calibrations that may be used to achieve forty different fuel economies for EPA city and highway fuel economies (represented as open circles) for a particular vehicle program based on a computer-aided engineering (CAE) model. Specifically, the x-axis (refer to inset 201) of graph 200 depicts city fuel economy in miles per gallon (mpg), and the y-axis (refer to inset 201) of graph 200 depicts highway fuel economy in mpg. Base calibration 205 represents a calibration optimized for both city and highway fuel economy cycles. As shown at graph 200, base calibration 205 corresponds to a city fuel economy of 32.77 mpg and a highway fuel economy of 37.21 mpg. However, the base calibration 205 does not correspond to the best individual calibrations for highway fuel economy or city fuel economy. Specifically, calibration 210 corresponds to the best calibration option for highway fuel economy (37.56 mpg), while calibration 215 corresponds to the best calibration option for city fuel economy (33.56 mpg). Clearly, better fuel economy may be achieved if different calibrations were utilized under different driving conditions, as opposed to relying on base calibration 205. Specifically, city fuel economy may be improved by about 2.4% as compared to the base calibration (e.g. 33.56 mpg as compared to 32.77 mpg for the base calibration), whereas highway fuel economy may be improved by about 1% as compared to the base calibration (e.g. 37.56 mpg as compared to 37.21 mpg for the base calibration).

As discussed above, base calibrations may be desirable to use for vehicles that are not capable of planning or inferring travel routes. However, for vehicles that are capable of planning or inferring travel routes, changing powertrain calibration(s) based on the planned or inferred travel routes may improve/optimize a plurality of vehicle operating parameters in some examples. As mentioned above, in some examples starting and ending locations for a travel route may be provided to the vehicle controller via a software application, such as in the case of vehicles participating in a vehicle-for-hire program.

Turning now to FIG. 3, an example transportation facilitation system 300 of the present disclosure is depicted. Briefly, transportation facilitation system 300 is depicted to illustrate a manner in which a fleet of vehicles may be controlled, discussed with emphasis on how a vehicle selected for a particular travel request may mutually determine powertrain calibration and travel route based on a number of parameters corresponding to the travel request. Thus, it may be understood that the transportation facilitation system 300 pertains to vehicles participating in a vehicle-for-hire service. Discussed herein, a vehicle-for-hire service may include a vehicle-sharing model or service, a ride-sharing model or service, and a ride-hailing model or service. For example, a vehicle-sharing model may comprise a model of vehicle rental where a person can rent on-demand a vehicle for varying amounts of time, where the vehicle is driven by the person renting the particular vehicle. It may be further understood that a ride-sharing model refers to programs in which passenger trips are combined for passengers with a common destination (e.g. carpooling and vanpooling), with a goal of filling otherwise empty seats to ultimately save on costs. It may be still further understood that a ride-hailing model encompasses companies and services similar to a taxi services, where a customer hires a driver (or simply a vehicle in the case of autonomously operated vehicles) to take them exactly where they desire to go, via one of hailing a taxi, calling up a vehicle/taxi service by phone, or virtually hailing a vehicle via a software application on a remote computing device, for example.

Broadly defined, transportation facilitation system 300 may comprise components described below. Transportation facilitation system 300 may include a customer device 310 running customer app 318, a driver device 320 running driver app 328 (in the case of non-autonomously operated vehicles), fleet management system 305, and a plurality of vehicles 392 comprising a fleet of vehicles. It may be understood that the customer app, driver app (where applicable), and fleet management system may together comprise a single software application. In some examples, discussed herein, customer app 318 may be referred to as customer-side app 318 to illustrate it is the side of the software application the customer interacts with on customer device 310. Similarly, driver app 328 may be referred to as driver-side app 328 to illustrate it is the side of the software application the driver interacts with on driver device 320. Thus, it may be understood that the fleet management system 305 comprises the backend of the software application. It may be understood that each of the customer device 310 and the driver device 320 (where applicable) may comprise remote computing devices, including but not limited to smartphones, laptops, tablets, etc. Each of the customer device 310, the driver device 320 (where applicable) and the fleet management system 305 may include a logic subsystem 311, 321 and 385, respectively. Each of logic subsystem 311, 321 and 385 may be substantially similar in terms of function, and thus the description below equally applies to each of logic subsystem 311, 321 and 305.

The logic subsystems may include one or more physical devices configured to execute one or more instructions. For example, the logic subsystems may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Each of the logic subsystems may include one or more processors that are configured to execute software instructions. Additionally or alternatively, the logic subsystems may include one or more hardware or firmware logic machines configured to execute hardware or firmware instructions. Processors of the logic subsystems may be single or multi-core, and the programs executed thereon may be configured for parallel or distributed processing. The logic subsystems may optionally include one or more engines for processing and analyzing data.

Each of the customer device 310, driver device 320 and fleet management system 305 may include a data-holding subsystem 312, 322, and 386, respectively. Each of data-holding subsystem 312, 322 and 386 may be substantially similar in terms of function, and thus the description below equally applies to each of data-holding subsystem 312, 322 and 386.

Each of the data-holding subsystems may each include one or more physical, non-transitory devices configured to hold data and/or instructions executable by the logic subsystems to implement parts of the herein described methods and processes. When such methods and processes are implemented, the state of the data-holding subsystems may be transformed (for example, to hold different data).

Each of the data-holding subsystems may include removable media and/or built-in devices. Additionally or alternatively, each of the data-holding subsystems may include optical memory (for example, CD, DVD, HD-DVD, Blu- Ray Disc, etc.), and/or magnetic memory devices (for example, hard drive disk, floppy disk drive, tape drive, MRAM, etc.), and the like. Additionally or alternatively, each of the data-holding subsystems may include devices with one or more of the following characteristics: volatile, nonvolatile, dynamic, static, read/write, read-only, random access, sequential access, location addressable, file addressable, and content addressable. It is to be appreciated that each of data-holding subsystems shown at FIG. 3 include one or more physical, non-transitory devices.

Each of customer device 310, driver device 320 and fleet management system 305 may include display subsystems 313, 323 and 389, respectively. Each of the display subsystems may be substantially similar in terms of function, and thus the description below equally applies to each of display subsystems 313, 323 and 389. The display subsystems may be used to present a visual representation of data held by data-holding subsystems. As the herein described methods and processes change the data held by the data-holding subsystems and thus transform the state of the data-holding subsystems, the state of the display subsystems may likewise be transformed to visually represent changes in the underlying data. Each of the display subsystems may include one or more display devices utilizing virtually any type of technology.

Each of customer device 310, driver device 320 and fleet management system 305 may include communication subsystem 314, 324 and 388, respectively. Each of the communication subsystems may be substantially similar in terms of function, and thus the description below equally applies to each of the communication subsystems of FIG. 3.

The communication subsystems may be configured to communicatively couple customer device 310, driver device 320 and fleet management system 305 with each other and/or one or more other computing systems, including but not limited to traffic management server 335, weather server 340, cloud-based server 154, vehicle control system 190, geo-location server 342, etc., each of which will be discussed in further detail below. Each of the communication subsystems may include wired and/or wireless communication devices compatible with one or more different communication protocols. As non-limiting examples, each of the communication subsystems may be configured for communication via a wireless telephone network, a wireless local area network, a wired local area network, a wireless wide area network, a wired wide area network, etc. In some examples, the communication subsystems may allow customer device 310 and/or driver device 320 to send and/or receive messages, data and other information from other devices and systems via network 331. In some examples, network 331 may be the public Internet. While depicted as network 331, it may be understood that in some example network 331 may be the same as network 131 depicted above at FIG. 1.

Each of customer device 310 and driver device 320 may include GPS module 315 and GPS module 325, respectively. In some examples, fleet management system 305 may include a route planning module that may include or receive information from GPS module 356. Route planning module 355 may in some examples be used to develop a plurality of potential routes that a vehicle may potentially use responsive to a travel request being received at the fleet management system 305. It may be understood that each of the GPS modules may be substantially similar in terms of functionality. For example, each of the GPS modules may be capable of receiving (via dedicated receivers, not shown) satellite signals which may enable a location to be accurately determined.

Customer device 310 may include a customer app or customer-side app (e.g. software application) 318. Similarly, driver device 320 may include a driver app or driver-side app (e.g. software application) 328. The customer app 318 will be first described below.

Customer app 318 may in one example enable a customer to request vehicle-for-hire services, as mentioned above. Customer app 318 may include options for inputting a desired starting location and a desired ending location pertaining to a travel request, for example. In some examples, customer app 318 may additionally include options for inputting any planned stops or intermediate destinations between the desired starting location and the desired ending location. In some examples, customer app 318 may include options for specifying a desired time in which the customer desired to be picked up, or a desired time in which the customer desires to commence driving a car-share vehicle.

When used for vehicle-for-hire services, customer app 318 may include options for selecting or inputting user preferences. Customer preferences may include preferences related to fuel economy, price for the specified travel routine, comfort level (e.g. business or economy class), vehicle performance, desired time frame for arriving at the specified destination, vehicle type (e.g. SUV, sedan, truck), etc. In some examples, customer app 318 may include options for inputting current customer status, including but not limited to whether the customer is stressed or relaxed, whether the customer is rushing to a meeting, whether the customer is on vacation, etc. In other words, in some examples customer app 318 may include options related to current customer mental/physical status.

Turning now to the driver app 328, it may be understood that via the driver app 328, a driver of a vehicle may receive instructions on driver device 320 from fleet management system 305. For example, instructions pertaining to where to pick up a particular customer requesting a ride may be sent to the driver device 320 from fleet management system 305 via driver app 328. Instructions pertaining to travel route directions for a particular travel route may in some examples also be communicated to a driver via driver app 328. In a case where the vehicle is autonomously operated and thus a driver is not present in the vehicle, it may be understood that fleet management system 305 may send instructions pertaining to where to pick up a customer to vehicle control system 190, such that the vehicle may autonomously navigate to the specified pickup location.

Turning now to fleet management system 305, it may be broadly understood that fleet management system 305 may, via network 331, receive customer requests from customer app 318, process the customer requests, and send appropriate instructions to driver app 328 stored on driver device(s) 320 (in the case of non-autonomously operated vehicles), or directly to vehicle control system 190 (in the case of autonomously operated vehicles). For example, instructions may relate to location for pickup of a customer or customers, and may include in some examples driving directions from a current location of the vehicle to the pickup location.

Fleet management system 305 may thus include matching module 370. Broadly speaking, it may be understood that matching module 370 may match particular customer requests with an appropriate vehicle from the fleet. Matching module 370 may receive customer requests via customer interface 360. Matching module 370 may further receive information pertaining to variables associated with vehicles comprising the fleet of vehicles 392 being managed via fleet management system 305 via provider interface 365. Fleet management system 305 may communicate (e.g. send information to and receive information from) with vehicles comprising the fleet of vehicles 392 via one or more of driver app 328 and vehicle control system 190. It may be understood that each vehicle comprising the fleet of vehicles may include its own vehicle control system 190 and in examples where the vehicle is not an autonomous vehicle, may further include a driver with a driver device 320 running driver app 328. For example, a current location of particular vehicles comprising the fleet may be communicated to matching module 370 via provider interface 365 from driver app 328 and/or vehicle control system 190. In other words, driver app 328 and/or vehicle controller 153 (in collaboration for example with the onboard navigation system) may continually retrieve information pertaining to vehicle location, and may communicate such information to matching module 370 of fleet management system 305 via provider interface 365. Such information may include in some examples an estimated time or distance until a particular vehicle drops off a passenger or passengers. In other words, such information may include an estimated time or distance until a particular vehicle may accept another customer request (e.g. become available). Such information may be useful for route planning by the fleet management system 305, particularly with regard to matching module 370.

As mentioned above, fleet management system 305 may include route planning module 355, which may include or be in communication with GPS module 356. In some examples, route planning module 356 may, in response to a customer request, generate one or more potential routes for satisfying as best possible the customer request including customer preferences. As will be discussed in further detail below, such suggested routes may in some examples be provided to the vehicle controller 153 of a vehicle matched via the matching module 370. Furthermore, in some examples the customer preferences may too be provided to the vehicle controller 153 of the vehicle matched via the matching module 370. The suggested routes may in some examples be assessed via the vehicle controller in conjunction with the calibration module 195, and may be selected or modified as a function of calibrations stored at the calibration database. In other words, as will be elaborated in further detail below, routes suggested via the fleet management system may be evaluated in terms of optimal powertrain calibration and travel route options for satisfying particular customer requests. In some examples, one of the routes suggested by the fleet management system 305 may be mutually selected via the vehicle control system along with a powertrain calibration as will be elaborated in further detail below. In other examples, the vehicle controller in conjunction with one or more of the calibration module, route-learning module and onboard navigation system may mutually develop an alternative route and associated powertrain calibration pairing that satisfies the customer request in terms of customer preferences and travel destination in a manner better than the routes suggested by the fleet management system 305.

For developing the suggested routes, fleet management system 305 may retrieve, via server interface 363, information pertaining to one or more of current and forecasted environmental conditions from weather server 340, current and forecasted traffic conditions from traffic management server 335, information pertaining to geographically-based emissions requirements from geo-location server 342, etc. Such information may be used by fleet management system 305 to develop routes in conjunction with customer preferences.

Similarly, vehicle control system 190 may additionally or alternatively retrieve information pertaining to one or more of the current and forecasted environmental conditions from weather server 340, current and forecasted traffic conditions from traffic management server 335, information pertaining to geographically-based emissions requirements from geo-location server 342, etc. Such information may be used by the particular selected vehicle to develop a route or routes based on customer preferences, along with information retrieved from the calibration database 183 so as to mutually determine a particular route and powertrain calibration pairing that satisfies customer preferences in a best manner possible.

Thus, it may be understood that the fleet management system 305 may provide suggested routes to the vehicle control system of the vehicle selected or matched to a particular customer request, however it is the selected vehicle itself that may ultimately determine the particular route and powertrain calibration pairing for satisfying the particular customer request. Once the route and powertrain calibration pairing is determined via the vehicle controller, information pertaining to the determined route may be communicated to the fleet management system, so as to update the fleet management system with regard to travel plans. In the case where a driver operates the vehicle selected for satisfying a particular customer request, the fleet management system 305 may communicate the selected route to the driver app 328, such that the driver of the vehicle may navigate the vehicle along the selected route. Alternatively, in the case where the vehicle selected for satisfying the particular customer request is an autonomous vehicle, the selected route may be communicated to the autonomous control system (e.g. autonomous control system 193 at FIG. 1) for navigating the vehicle along the selected route.

Turning now to FIG. 4, an example illustration 400 is depicted, showing a representative example of the type of data that may be stored at calibration database 183 (e.g. calibration database 183 at FIG. 1). For illustrative purposes, only two routes are depicted, route 1 and route 2, however it may be understood that any number of routes and associated calibration sets may be stored at calibration database 183. With regard to illustration 400, it may be understood that route 1 corresponds to a route through a city that does not include highway driving, whereas alternatively route 2 corresponds to a route that involves substantial highway driving, for example greater than 90% of the route includes highway driving. As discussed above, in some examples such routes and powertrain calibrations may be learned over time. Additionally or alternatively, route types and associated powertrain calibrations may be populated in calibration database 183 manually (e.g. via a technician). However, for discussion purposes, it may be understood that for example illustration 400, routes and associated powertrain calibrations are learned over time.

For illustrative purposes, four different powertrain calibrations including first calibration 405, second calibration 408, third calibration 411, and fourth calibration 414 are shown associated with route 1, and another four different powertrain calibrations including fifth calibration 420, sixth calibration 423, seventh calibration 427 and eighth calibration 430 are shown associated with route 2. However, while four different calibrations are shown for each of route 1 and route 2, it may be understood that any number of calibrations may be included for each route without departing from the scope of this disclosure.

Each calibration (e.g. first calibration, second calibration, and so on) includes five different general calibration categories defined by letters A-E. Inset 401 shows that calibration category A corresponds to calibrations associated with fuel economy, calibration category B corresponds to calibrations associated with environmental conditions (e.g. calibration for summer vs. winter), calibration category C corresponds to calibrations associated with ride performance, calibration category D corresponds to a calibration set associated with ride quality (e.g. increased or decreased NVH), and calibration category E corresponds to a calibration set associated with geographical requirements (e.g. location-specific emissions standards). Numerals associated with each calibration data set A-E may be understood to represent different variations in terms of calibration parameters within each calibration category. The exact numerals are not relevant to the present disclosure, but it may be understood that, for example A1 as compared to A2 indicates two different calibrations related to fuel economy. It may be understood that there may be any number of different fuel economy calibrations corresponding to calibration category A (e.g. A1-$A_n$), any number of different performance calibrations corresponding to calibration category B (e.g. B1-$B_n$), any number of different ride quality calibrations corresponding to calibration category C (e.g. C1-$C_n$), and so on.

Accordingly, it may be understood that each of first calibration 405, second calibration 410, and so on each include some combination of calibration sets that include but are not limited to the general categories of fuel economy, environmental conditions, performance, ride quality, and geographical requirements.

For illustrative and comparative purposes, first calibration 405 and fifth calibration 420 each are associated with a summertime calibration (e.g. B1 corresponding to summer calibration for the city route compared to B4 corresponding to summer calibration for the highway route), second calibration 408 and sixth calibration 423 each are associated with a wintertime calibration (e.g. B2 corresponding to winter calibration for the city route compared to B5 corresponding to winter calibration for the highway route), third calibration 411 and seventh calibration 427 each are associated with a preference for vehicle performance over fuel economy and ride quality (e.g. A3 calibration heavily preferences fuel economy for city driving whereas A8 heavily preferences fuel economy for highway driving), and fourth calibration 414 and eighth calibration 430 each are associated with a preference for improved ride quality over fuel economy and performance (e.g. D2 calibration heavily preferences ride quality for city driving whereas D5 heavily preferences ride quality for highway driving).

More specifically, for route 1, first calibration 405 and second calibration 408 differ in that the calibration category B corresponding to environmental conditions includes variation 1 (e.g. B1) for the summertime calibration, but variation 2 (e.g. B2) for the wintertime calibration. Along similar lines, for route 2, fifth calibration 420 and sixth calibration 423 differ in that the calibration category B corresponding to environmental conditions includes variation 4 (e.g. B4) for the summertime calibration but variation 5 (e.g. B5) for the wintertime calibration.

As another example, third calibration 411 differs from first calibration 405 in that the calibration category A corresponding to fuel economy includes variation 3 (e.g. A3) and calibration category C corresponding to performance includes variation 2 (e.g. C2) for third calibration 411, as compared to first calibration 405 which includes variation 1 (e.g. A1) for calibration category A and variation 1 (e.g. C1) for calibration category C. It may be understood that the above-mentioned differences render third calibration 411 better in terms of performance than in terms of fuel economy, as compared to, for example first calibration 405.

As yet another example, fourth calibration 414 differs from eighth calibration 430 in that fourth calibration 414 includes variation 5 for calibration category A, variation 1 for calibration category B, variation 4 for calibration category C, and variation 2 for calibration category D, whereas eighth calibration 4430 includes variation 7 for calibration category A, variation 4 for calibration category B, variation 8 for calibration category C, and variation 5 for calibration category D. Thus, it may be understood that in order to preferentially improve ride quality over performance and fuel economy, different calibrations may be used depending on whether the vehicle is traveling along the first route or the second route.

Thus, FIG. 4 depicts the sort of data that may be included in calibration database 183. Such data may be useful for mutually determining a particular route and powertrain calibration pair in response to a travel request.

A manner in which a route and powertrain combination or pair may be mutually determined is depicted in further detail at FIG. 5. Accordingly, turning now to FIG. 5, an example illustration 500 depicts potential routes A, B and C related to a particular travel request, travel route and powertrain calibration information stored at the calibration database (e.g. 183), and a determined route and powertrain combination.

In one example potential routes A, B and C may comprise routes suggested by the fleet management system (e.g. fleet management system 305 at FIG. 3) based on a travel request received from a customer. In another example, potential routes A, B and C may comprise routes developed by the vehicle controller in response to receiving a travel request. The potential routes may in some examples be developed to satisfy a number of parameters corresponding to the travel request (e.g. preferences related to fuel economy, comfort, emissions, cost, performance, travel time, etc.). Additionally or alternatively, the potential routes may be developed by accounting for distance (e.g. starting location and ending destination information) and inferred amount of travel time corresponding to the travel request. Additionally or alternatively, potential routes may be developed in conjunction with information pertaining to traffic conditions and/or weather conditions in light of the above-mentioned parameters corresponding to the travel request. As depicted at FIG. 5, three potential travel routes may be determined, however in other examples more or less than three potential travel routes may be determined.

With the potential routes determined or otherwise received at the vehicle controller, the controller may compare the potential routes to any number of travel routes and associated powertrain calibrations stored at the calibration database. It may be understood that the vehicle controller may first determine routes stored at the calibration database that are similar to the potential routes. For example, the vehicle controller may filter out all routes stored at the calibration database that are not similar to the potential routes. For example, if the potential routes correspond to short (e.g. 2-5 mile) routes through a city environment, then longer routes and/or routes that include highway travel may be filtered out. In a related example, if the potential routes are devoid of uphill travel, then routes stored at the calibration database that include substantial uphill travel (e.g. a threshold distance amount of uphill travel) may be filtered out from the analysis. In another related example, if the potential routes correspond to routes with low vehicle speeds, then routes that are associated with high vehicle speeds may be filtered out from the analysis. From the remaining routes that have not been filtered out, it may be understood that routes substantially similar in nature to the potential routes may be selected for analysis. As an example, routes that are substantially similar to the potential routes may include routes within a threshold distance (e.g. in miles) of the potential routes, routes that include a similar level of traffic congestion as the potential routes, routes that are associated with similar weather conditions as the potential routes, routes that are associated with similar time frames for arriving at the destination as the potential routes, routes that are associated with similar elevation changes as the potential routes, routes associated with vehicles speeds inferred to be similar to vehicle speeds for the potential routes, etc. Thus, it may be understood that in examples where the potential routes do not comprise routes stored at the calibration database, then the vehicle controller may select routes that are substantially similar to the potential routes as discussed. However, in some examples one or more of the potential routes may include a same route as a route stored at the calibration database. In the case where one or more of the potential routes comprise routes stored at the calibration database, then it may be understood that such routes may be selected for analysis.

Returning to example illustration 500 with regard to the calibration database, dashed line 519 separates selected routes 517 from powertrain calibrations 518 associated with selected routes 517. Thus, as discussed, example illustration 500 depicts potential routes A, B and C. The routes selected for analysis as being similar to potential routes A-C include route 1, route 2, route 3 and route A. In other words, route A is stored at the calibration database, and thus because route A also comprises a potential route, route A is selected for analysis. It may be understood that route B and route C are not specifically stored at the calibration database, and thus, other routes that are similar to the potential routes are selected as discussed above. In this example, it may be understood that the routes selected for analysis comprise route 1, route 2 and route 3. However, as shown, route A comprises a suggested route, and route A also comprises a route stored at the calibration database.

Each of route 1, route 2, route 3, and route A stored at the calibration database are associated with any number of powertrain calibrations. For illustrative purposes, four such powertrain calibrations are depicted for each route selected from the calibration database. For example, route 1 includes first calibration 520, second calibration 521, third calibration 522 and fourth calibration 523. Route 2 includes fifth calibration 524, sixth calibration 525, seventh calibration 526, and eighth calibration 527. Route 3 includes ninth calibration 528, tenth calibration 529, eleventh calibration 530, and twelfth calibration 531. Route A includes thirteenth calibration 532, fourteenth calibration 533, fifteenth calibration 534, and sixteenth calibration 535. While not explicitly illustrated at FIG. 5, it may be understood that each calibration (e.g. first calibration 520) may include the different general calibration categories (e.g. categories A-E) as discussed above with regard to FIG. 4.

As a next step in the analysis, the routes (e.g. route 1, route 2, route 3 and route A) and associated powertrain calibrations selected from the calibration database for analysis may be assessed with regard to the potential routes (routes A-C) taking into account any parameters input with regard to the travel request related to preferences (e.g. fuel economy preferences, performance preferences, comfort level preferences, travel time preferences, emissions preferences, etc.). Further parameters taken into account may include geographical location requirements (e.g. stringent or less stringent emissions requirements), environmental parameters such as whether it is summer or winter, etc. Thus, potential route A may be evaluated for which powertrain calibration (e.g. calibrations 520-535) may be most effective for fulfilling the travel request in a case where potential route A is selected. Such analysis is depicted illustratively via dotted lines 505. Similarly, potential route B may be evaluated for which powertrain calibration may be most effective for fulfilling the travel request in a case where potential route B is selected. Such analysis is depicted illustratively via solid lines 510. Along similar lines, potential route C may be evaluated for which powertrain calibration may be most effective for fulfilling the travel request in a case where potential route C is selected. Such analysis is depicted illustratively via dashed lines 515.

In this example illustration 500, it may be understood that the output of the analysis is that the route and powertrain calibration pair that is determined to be most effective in satisfying the travel request includes the vehicle navigating by way of route B, with the powertrain calibration 525. For the analysis, there may be a weighting system that weights different route/powertrain calibration combinations according to how well the route/powertrain calibration combination can satisfy all parameters corresponding to the travel request. For example, a route/powertrain calibration combination that satisfies all parameters of the travel request may be more heavily weighted via the analysis than other combinations that satisfy less parameters of the travel request. After weighting the different potential route and powertrain calibration combinations, the route and powertrain calibration combination that is most heavily weighted may be selected. As discussed, in this example illustration 500, the route selected includes route B, and the powertrain calibration selected includes powertrain calibration 525.

As discussed above with regard to FIG. 3, in some examples a travel request may correspond to a travel request input into a software application via a customer, where the request is received via a fleet management system (e.g. fleet management system 305 at FIG. 3) that processes the travel request and then sends information pertaining to the travel request to a controller of a vehicle selected or matched to the travel request. In other words, in some examples the travel request may correspond to a customer-generated request related to a vehicle-for-hire service.

Accordingly, turning now to FIG. 6, an example method 600 is shown for determining a travel route and powertrain calibration combination pertaining to a particular travel request for a vehicle-for-hire service received from a customer. Method 600 will be described with reference to the systems described herein and shown in FIG. 1 and FIG. 3, though it will be appreciated that similar methods may be applied to other systems without departing from the scope of this disclosure. Instructions for carrying out method 600 and the rest of the methods included herein may be executed by a controller, such as controller 153 of FIG. 1, based on instructions stored in non-transitory memory, and in conjunction with information retrieved from one or more of a fleet management system (e.g. fleet management system 305 at FIG. 3), traffic management server(s) (e.g. traffic management server 335 at FIG. 3), weather server(s) (e.g. weather server 340 at FIG. 3), geo-location server(s) (e.g.

geo-location server 342 at FIG. 3), powertrain calibration database (e.g. powertrain calibration database 183 at FIG. 3), etc.

Method 600 begins at 605 and includes receiving at the controller a travel request from the fleet management system. In other words, it may be understood that by step 605, the customer-generated travel request has been received and processed via the fleet management system (e.g. fleet management system 305 at FIG. 3), and the vehicle associated with the controller that receives the travel request has been selected by the fleet management system for fulfilling the travel request. As discussed above, based on the travel request the fleet management system may generate one or more suggested travel routes that at least partially satisfy various parameters pertaining to the travel request. In such a case, the one or more suggested travel routes may be sent to the vehicle controller along with the travel request. However, as mentioned above additionally or alternatively the vehicle controller itself may generate the one or more potential travel routes based on the travel request and associated customer-defined parameters pertaining to the travel request.

Proceeding to 610, method 600 may include assessing the suggested or potential travel routes in terms of powertrain calibrations for meeting the customer travel request. In other words, the illustrative methodology discussed in detail above with regard to FIG. 5 may be utilized to mutually select a particular route and powertrain calibration combination. Briefly, the suggested or potential travel routes may analyzed together with powertrain calibrations associated with similar routes. In other words, routes stored at the calibration database that are similar to the suggested routes may be selected, where such routes stored at the calibration database include one or more associated powertrain calibrations. Then, powertrain calibration and suggested route combinations may be analyzed together. Specifically, each powertrain calibration and suggested route combination may be analyzed and weighted according to how well the particular powertrain calibration and suggested route combination fulfills the various parameters of the travel request. Powertrain calibration and suggested route combinations that better satisfy the various parameters of the travel request may be ranked higher than those powertrain calibration and suggested route combinations that do not as effectively satisfy the various parameters of the travel request. In this way, each powertrain calibration and suggested route pairing may be assigned a weight or ranking, such that each pairing may be compared to one another for selecting an optimal route and powertrain calibration pairing for the particular travel request.

Next, proceeding to 615, method 600 may include indicating whether the highest weighted calibration and route pairing is greater than a threshold weight. For example, the threshold weight may comprise a weight where the particular powertrain calibration and route pair may effectively cater to each of the various parameters of the travel request. In other words, powertrain calibration and route pairs with weights below the threshold weight may include tradeoffs that render such calibrations non-optimal with regard to the various parameters of the travel request.

Accordingly, at 615, in a case where the highest weighted calibration has a weight greater than the threshold weight, method 600 may proceed to 620. At 620, method 600 may include selecting the powertrain calibration and route pair determined to have the highest weight or ranking.

Proceeding to 625, method 600 may include loading the selected powertrain calibration from the calibration database. For example, the selected powertrain calibration may be loaded into an appropriate control unit or module. In one example the appropriate control unit may comprise an engine control unit.

Continuing to 630, method 600 may include communicating the selected travel route back to the fleet management system. In the case of an autonomous vehicle, communicating the selected travel route back to the fleet management system may serve to inform the fleet management system of the vehicle travel plans. Alternatively, in the case where the vehicle is not autonomously operated (e.g. a driver operates the vehicle), the travel route may be received at the fleet management system and may then be sent from the fleet management system to the driver device (e.g. driver device 320 at FIG. 3) via the driver-side app (e.g. driver-side app 328). By sending the travel route to the fleet management system, which then sends the travel route to the driver device, the driver may be informed as to the selected travel route by which to navigate the vehicle for the travel request.

Proceeding to 635, method 600 may include operating the vehicle using the selected powertrain calibration for the travel request. Method 600 may then end.

Returning to 615, in a case where the highest weighted calibration is not greater than the threshold weight, method 600 may proceed to 640. At 640, method 600 includes developing a route and powertrain calibration combination based on the parameters corresponding to the travel request. In other words, in some examples the suggested routes may not have a substantially similar corresponding route stored at the calibration database, and thus the powertrain calibrations and suggested route pairs analyzed may not produce a route and powertrain calibration pairing that effectively addresses the various parameters of the travel request (e.g. route and powertrain calibration pairings are weighted to below the threshold weight). In such an example, based on the starting and ending locations corresponding to the travel request along with the other preferences corresponding to the travel request, alternative routes may be determined (in conjunction with, for example, the onboard navigation system), and a similar process as that discussed above may be carried out in order to determine if it is possible to find a powertrain calibration or calibrations associated with a similar type of route as one of the alternative routes that may better satisfy the various parameters corresponding to the travel request. In such a case, it may in some examples be possible to find an alternative route for which a highest weighted powertrain calibration and route pair is greater than the threshold weight, but on the other hand in other examples it may not be. In a case where a highest weighted calibration and route pair corresponding to an alternative route is found that is greater than the threshold weight, then that calibration may be selected along with the corresponding alternative route. In a case where a highest weighted calibration corresponding to an alternative route is found that is not greater than the threshold weight, but is greater than the next highest weighted calibration previously determined for the suggested routes, then the highest weighted calibration corresponding to the alternative route may be selected along with the corresponding alternative route. In a case where a highest weighted calibration corresponding to an alternative route is not greater than the highest weighted calibration previously determined for the suggested routes, then the highest weighted calibration previously determined along with its corresponding route may be selected.

However, there may be another option in some examples where the controller of the vehicle may create a new calibration for a particular suggested route or particular alternative route that may more effectively satisfy the travel request with regard to the various parameters of the travel request. For example, as discussed above at FIG. 4 each calibration corresponding to particular routes stored at the calibration database may include different general calibration categories, including but not limited to calibrations associated with fuel economy, calibrations corresponding to environmental conditions, calibrations corresponding to ride performance, calibrations corresponding to ride quality or comfort, calibrations corresponding to geographical requirements, etc. The calibration database may store numerous calibrations corresponding to each of the general calibrations categories, in similar fashion as that discussed above with regard to FIG. 2. In a case where a stored route and powertrain calibration is determined to not be able to effectively satisfy a particular travel request, then a new custom powertrain calibration may be generated, where generating the new custom powertrain calibration includes selecting calibrations corresponding to one or more of the general calibration categories in a manner that generates the new custom powertrain calibration more in line with the various parameters of the travel request. An example of such methodology is depicted at FIG. 9 below. Thus, in this manner the calibration database may be populated with additional powertrain calibrations associated with particular routes, and as will be discussed in greater detail below such calibrations may be evaluated as to performance to enhance the ability of the controller to effectively assign particular powertrain calibrations to particular routes.

Proceeding to 645, method 600 includes loading the selected powertrain calibration from the calibration database, similar to that discussed above at 625. Proceeding to 630, method 600 includes communicating the selected travel route to the fleet management system, as discussed above. At 635, method 600 includes operating the vehicle using the selected powertrain calibration for the travel request. Method 600 may then end.

For the example method discussed above and other methods discussed herein, it may be understood that operating the vehicle using the selected powertrain calibration may include controlling engine actuators according to the selected powertrain calibration. For example, fuel injection timing and/or spark timing may be differentially controlled depending on the particular powertrain calibration. As another example, throttle position with respect to accelerator pedal position may be differentially controlled depending on the particular powertrain calibration. As yet another example, an amount of exhaust gas recirculation may be differentially controlled under various engine operating conditions depending on the particular powertrain calibration. In still other examples, an air intake compressor may be differentially controlled for various engine operating conditions depending on the powertrain calibration.

The present disclosure relates to any number of different powertrain calibrations and thus exhaustive description of how each actuator is controlled with regard to different powertrain calibrations is outside of the scope of this disclosure. However, as discussed, it may be understood that particular powertrain calibrations may utilize differential control of appropriate engine actuators to achieve desired engine output including but not limited to fuel economy, vehicle performance, environmental conditions, geographical location requirements, and ride quality.

Turning now to FIG. 7, an example communication timeline 700 is shown detailing a flow of communication between the customer-side app (e.g. customer-side app 318 at FIG. 3), the fleet management system (e.g. fleet management system 305 at FIG. 3), and the controller (e.g. controller 153 at FIG. 1) of a vehicle matched to a particular travel request submitted to the fleet management system via a customer using the customer-side app. In other words, communication timeline 700 details a communication flow associated with the method of FIG. 6. With regard to FIG. 7, time is depicted as increasing in the direction of arrow 701.

At 702, the customer-side app receives a travel request input to the customer-side app via a customer. As discussed above, the travel request may include at least a starting location and an ending location or destination, and may further include a variety of customer preferences related to the travel route. The information input to the customer app at 702 is then sent to the fleet management system. At 704, the fleet management system receives the travel request. At step 706, the fleet management system proceeds with identifying a vehicle that can fulfill the travel request. Identifying a vehicle may include the fleet management system sending a request for vehicle location data and availability data for vehicles comprising the fleet of vehicles (e.g. fleet 392 at FIG. 3), receiving such information, and selecting a particular vehicle to fulfill the travel request that is in line with various parameters of the travel request. For example, if the customer requests a certain type (e.g. SUV) of vehicle, then vehicles that are not of the requested type may be excluded. As discussed above, the matching module (e.g. matching module 370 at FIG. 3) of the fleet management system may be relied upon for effectively matching a vehicle with the particular travel request.

With the vehicle for satisfying the travel request identified, at 708 one or more routes are developed by the fleet management system for fulfilling the travel request based on the information input by the customer into the customer-side app. For developing the route, the fleet management system may rely on the route planning module (e.g. route planning module 355 at FIG. 3) discussed above. Furthermore, developing the route may include the fleet management system retrieving information pertaining to current and forecasted traffic information relevant to the travel request from a traffic management server (e.g. traffic management server 335 at FIG. 3), and/or current and forecasted weather information relevant to the travel request from a weather server (e.g. weather server 340 at FIG. 3). The route or routes may be developed taking into account current and forecasted traffic and weather conditions, in conjunction with customer-inputted preferences, for example. As an example, if the customer is in a hurry, routes with significant congestion may be avoided where possible. The routes developed by the fleet management system may be understood to comprise suggested or potential routes, as discussed above. Specifically, because the fleet management system does not have access to the calibration database (e.g. calibration database 183 at FIG. 3), the routes developed by the fleet management system may comprise suggested or potential routes and, as discussed above and which will be further elaborated below, the route ultimately determined is selected via the vehicle controller as a function of powertrain calibration data stored at the calibration database.

With the one or more routes developed via the fleet management system, the fleet management system sends the information corresponding to the travel request along with the suggested routes to the controller of the vehicle selected to fulfill the travel request. Specifically, it may be understood that in order for the vehicle controller to effectively determine a route and powertrain combination that is optimal for fulfilling the travel request, all of the relevant parameters input to the customer app pertaining to the travel request may be sent to the vehicle controller.

At 710, the vehicle controller receives the suggested routes along with the other relevant information corresponding to the customer-input travel request parameters. At 712, the vehicle controller pairs one of the suggested routes with a particular powertrain calibration stored at the calibration database, or alternatively develops a route and powertrain calibration pair, as discussed in detail above with regard to the method of FIG. 6. Briefly, the vehicle controller may first find one or more routes stored in the calibration database that are similar to one or more of the suggested routes. For searching the database to find similar routes as those suggested by the fleet management system, an algorithm or program stored at the controller that takes into account various parameters of routes in order to identify similar routes stored at the calibration database may be utilized. For example, the program may identify similar features between the suggested routes and routes stored at the calibration database, where routes that do not include such similar features may be filtered out. Via such a filtering process, routes similar to those suggested may be identified with high accuracy. As an example, a suggested route may comprise a city route with a particular amount of elevation change, and a particular distance. In some examples, the exact same route may be stored at the calibration database (for example if the same customer has previously requested the same travel route), which the program or algorithm may identify for analysis. However, in other examples, the exact same route may not be stored in the calibration database, but other similar routes may be stored therein. In such an example, one or more routes with similar aspects as that of the suggested route may be identified via the program or algorithm. Specifically, a route or routes that are within a threshold distance of the suggested route and that include an amount of elevation change within a threshold amount of the suggested route may be identified by the program as being similar to the suggested route. In some examples, inferred vehicle speed as a function of time along potential routes may be compared to vehicle speed as a function of time for routes stored at the calibration database in order to find similar routes (e.g. potential routes that have an inferred vehicle speed over time within a threshold of vehicle speed over time traces corresponding to routes stored at the calibration database).

With similar routes identified, the vehicle controller may next mutually analyze stored calibrations corresponding to the similar routes in terms of the potential travel routes, in order to coincidentally identify a particular calibration and route combination that is able to effectively fulfill the travel request. Briefly, as described above, there may be any number of different calibrations associated with a particular stored route, due to the calibration database being populated and updated as the vehicle travels along ever increasing numbers of travel routines. The stored calibrations may be analyzed together in a mutually dependent manner with the suggested routes to identify the best calibration/route combination that effectively satisfies the various parameters of the travel request. As an example, in a case where the travel request includes a customer request to prioritize fuel economy over performance, the route/calibration combinations that do not effectively prioritize performance over fuel economy may be given a lower weight or ranking, whereas route/calibration combinations that effectively prioritize fuel economy over performance may be given a higher weight or ranking. By assigning different weights or rankings to powertrain calibrations/route pairs, the vehicle controller may determine the best route and powertrain calibration for satisfying the travel request. For example, the more effectively various parameters of the travel request can be met by a specific travel route and powertrain calibration combination, the higher the overall ranking or weighting.

If, as discussed above, the highest weighted calibration/route pairings include a weight of lower than the threshold weight, as mentioned above, the vehicle controller may attempt to develop a route and powertrain calibration pairing that more effectively meets the travel request. For example, the controller may develop a number of alternative routes, which may be analyzed in similar fashion as that discussed for the suggested routes, to determine if a better route and powertrain calibration pair may be identified for effectively meeting the travel request.

With the route and powertrain calibration pairing identified at 712, at 714 the selected powertrain calibration is loaded to the appropriate control unit (e.g. engine control unit). The vehicle controller then sends the information corresponding to the selected travel route to the fleet management system. While not explicitly illustrated, in some examples the loading of the selected powertrain calibration may occur at a time when the vehicle gets to the starting location or, in other words, the customer pickup location.

At 716, the fleet management system receives the selected travel route. While not explicitly illustrated, in a case where the vehicle selected to fulfill the travel request is operated by a driver, then the fleet management system may send instructions (e.g. driving directions and other relevant travel route information) to the driver device (e.g. driver device 320 at FIG. 3) via the driver-side app (e.g. driver-side app 328 at FIG. 3).

Whether the vehicle comprises an autonomously operated vehicle or a driver-operated vehicle, upon receiving the selected travel route at 716 the fleet management system may send information corresponding to the travel request back to the customer-side app (e.g. customer app 318 at FIG. 3). Such information may include updates as to current location of the vehicle, approximate time until the vehicle reaches the customer, selected travel route, information pertaining to whether the vehicle is autonomously operated or operated via a driver, estimated cost for the travel request, and any other information relevant to the customer requesting the travel request.

While the above discussion pertained to situations where a particular vehicle is part of a vehicle-for-hire service and where customer travel requests are coordinated via a fleet management system (e.g. fleet management system 305 at FIG. 3), it may be understood that in other examples similar methodology for selecting particular route and powertrain calibrations may be used for vehicles that are not part of a vehicle-for-hire service.

Thus, discussed herein, a method may comprise receiving a travel request at a controller of a vehicle. Via the controller, the method may include coincidentally determining a travel route and a powertrain calibration for the travel route in a mutually dependent manner from a plurality of potential travel routes and a plurality of powertrain calibrations, and operating the vehicle according to the powertrain calibration along the travel route.

In such a method, the plurality of powertrain calibrations may pertain to powertrain calibrations associated with routes previously traveled by the vehicle.

In such a method, the vehicle may be part of a vehicle-for-hire program. In such an example, the travel request may be communicated to the controller of the vehicle by way of a fleet management system that receives the travel request from a customer, selects the vehicle for fulfilling the travel request, and sends the travel request to the vehicle controller. In such an example, the plurality of potential travel routes may be received at the vehicle controller from the fleet management system.

In such a method, the travel request may include a starting location and an ending destination.

In such a method, the travel request may include one or more parameters related to fuel economy, vehicle performance, environmental conditions, geographical location, and ride quality. In such an example, coincidentally determining the travel route and the powertrain calibration in the mutually dependent manner may include accounting for the one or more parameters related to fuel economy, vehicle performance, environmental conditions, geographical location, and ride quality.

In such a method, the plurality of powertrain calibrations may be stored at a powertrain calibration database accessible via the controller of the vehicle. The plurality of potential travel routes may be developed by the controller in conjunction with an onboard navigation system.

In such a method, the plurality of powertrain calibrations may comprise a subset of powertrain calibrations selected from a larger number of calibrations, the subset selected based on the subset of powertrain calibrations having been previously used for routes similar in terms of one or more characteristics associated with the plurality of potential routes.

In some examples of such a method, the vehicle may be autonomously operated. Accordingly, turning now to FIG. 8 an example method 800 is shown for determining a travel route and powertrain calibration combination pertaining to a particular travel request received from a driver or passenger of a particular vehicle, where the vehicle is not part of a vehicle-for-hire service. In other words, method 800 may apply to a vehicle driven by an operator (e.g. driver), or an autonomous vehicle that carries a passenger or passengers. Importantly however, it may be understood that method 800 applies to vehicles capable of receiving travel requests along with preferences related to the travel request, similar to that discussed above. Because method 800 is not used for vehicles participating in a vehicle-for-hire service, rather than refer to a "customer", travel requests are referred to with regard to method 800 as input by a "user." Method 800 will be described with reference to the systems described herein and shown at FIG. 1, though it will be appreciated that similar methods may be applied to other systems without departing from the scope of this disclosure. Instructions for carrying out method 800 and the rest of the methods included herein may be executed by a controller, such as controller 153 of FIG. 1, based on instructions stored in non-transitory memory, and in conjunction with information retrieved from one or more of traffic management server(s) (e.g. traffic management server 335 at FIG. 1), weather server(s) (e.g. weather server 340 at FIG. 1), etc.

Method 800 begins at 805 and includes receiving a travel request at the controller of the vehicle. As an example, whether the vehicle comprises an autonomously operated vehicle or not, a user may input the travel request into the onboard navigation system that is communicably coupled to the vehicle controller. In such an example, the onboard navigation system may include options pertaining to user-preferences, similar to those preferences discussed in detail above. Specifically, there may be options for inputting preferences for particular travel requests related to fuel economy preferences, performance preferences, emissions preferences, comfort preferences, drive time preferences (e.g. user is in a hurry), etc. In another example, such customer preferences and travel request may be input to the vehicle controller in another manner, such as via a touch screen associated with the vehicle instrument panel, for example.

With the travel request received at the controller of the vehicle, method 800 may proceed to 810. At 810, method 800 includes developing a plurality of routes that at least partially satisfy the travel request. For developing the routes, the vehicle controller may request and retrieve information pertaining to current and forecast traffic conditions along with current and forecast weather conditions. For example, such information may be used to develop a route when a user preference is related to duration of travel. For example if the user specifies that they are in a hurry, then traffic information may be used to develop a route that avoids traffic congestion where possible, or in other words, develop a route with a minimum time between starting and ending locations.

Proceeding to 815, method 800 may include querying the calibration database to find similar routes already stored in the calibration database. As discussed above, the vehicle controller may include an algorithm or program that can effectively identify routes stored at the calibration database that are similar in nature to the developed routes. Similar to that discussed above, the routes stored at the calibration database may be associated with any number of calibrations, developed over time for example, as the vehicle goes on an ever increasing number of travel routines.

Thus, at 815, the vehicle controller may analyze the developed routes together with the calibrations, in order to rank or weight route and powertrain calibration combinations in similar fashion as that discussed above. Route and powertrain calibration combinations that are identified to be more in line with the travel request taking into account the different user preferences may be ranked or weighted higher than route and powertrain calibration combinations that compromise particular aspects of the travel request. The controller may store each of the rankings or weightings in order to determine the highest weighted route and powertrain calibration pairing.

At 820, the highest ranking route and powertrain calibration pairing may be selected for fulfilling the travel request, and at 825, method 800 includes loading the selected powertrain calibration at the appropriate control module.

At 830, method 800 includes proceeding with the travel request using the selected powertrain calibration. In an example where the vehicle comprises an autonomously operated vehicle, the vehicle may proceed along the travel route autonomously. In an example where the vehicle is operated by a driver, driving instructions corresponding to the selected travel route may be sent or selected via the onboard navigation system, which may assist the vehicle operator in navigating the vehicle along the selected travel route.

As mentioned above, there may be circumstances where it may be desirable to develop a powertrain calibration for use with a particular travel route. Accordingly, turning now to FIG. 9, an example method 900 is shown for developing a powertrain calibration that includes one or more of the various general calibration categories including but not limited to fuel economy, environmental conditions, performance, ride quality and geographical requirements. Briefly, based on various parameters pertaining to a travel request, a powertrain calibration for a route corresponding to the travel route may be developed by the process flow discussed below with regard to method 900. Instructions for carrying out method 900 and the rest of the methods included herein may be executed by a controller, such as controller 153 of FIG. 1, based on instructions stored in non-transitory memory.

Method 900 begins at 905 and includes receiving a travel request at the controller of the vehicle, the travel request including at least a starting location and an ending location, along with other various travel request-related parameters as discussed above. With the travel request received, method 900 proceeds to 910. At 910, method 900 includes developing a travel route that satisfies the travel request. In some examples, a plurality of travel routes may be developed, and the travel route that best satisfies the various parameters of the travel request may be selected. It may be understood that the vehicle controller may develop the travel route in conjunction with the onboard navigation system, and may in some examples be developed in further conjunction with information retrieved from the traffic management server, the weather server, etc.

With the travel route developed at 910, method 900 proceeds to 912, and includes selecting a fuel economy calibration for the route. As a representative example, referring to FIG. 2, one of the forty calibrations depicted may be selected depending on the route (e.g. city route vs highway route), and further based on any parameters related to fuel economy included with the travel request. For example, if the user or customer has provided information that indicates the user or customer is not interested in prioritizing fuel economy, then such information may be taken into account when selecting the fuel economy calibration.

With the fuel economy calibration selected, method 900 proceeds to 913. At 913, method 900 includes selecting a calibration corresponding to current environmental conditions. For example, certain calibration values may be associated with winter time vehicle operation, whereas other calibration values may be associated with summer time vehicle operation. The vehicle controller may retrieve, for example via the internet, via the navigation system, or via any other applicable means, time of year so as to properly select which calibration to use.

With the calibrations corresponding to the environmental conditions selected, method 900 proceeds to 914. At 914, method 900 includes selecting a calibration corresponding to vehicle performance for the route. For example, the calibration database may include any number of different calibrations related to vehicle performance that are dependent on any number of different performance-related factors. Accordingly, the various calibrations related to performance may be compared together with aspects of the determined route along with other relevant parameters corresponding to the travel request (e.g. whether the user or customer desires to prioritize ride performance or not), to select an appropriate vehicle performance calibration for the route.

With the performance calibration selected, method 900 proceeds to 915. At 915, method 900 includes selecting a ride quality calibration for the route. Specifically, the vehicle controller may assess various characteristics associated with the route (e.g. current and forecasted traffic conditions, current and forecasted weather conditions, number of stop lights and/or stop signs along the route, number of turns associated with the route, elevation changes associated with the route, whether the route includes sections of unpaved road, etc.), along with various parameters related to ride quality as input via the user or customer as part of the travel request.

With the ride quality calibration selected, method 900 proceeds to 916. At 916, method 900 includes selecting a calibration corresponding to geographical requirements as a function of the route. For example, the geographic coordinates corresponding to the route may be determined, and the vehicle controller may retrieve information pertaining to operational requirements (e.g. emissions requirements) for the route. Based on the retrieved information, an appropriate calibration corresponding to geographical requirements may be selected.

With the above mentioned calibrations selected, at 920, method 900 includes loading the calibration set that includes calibrations selected at steps 912-916 to the appropriate vehicle control unit. At step 925, method 900 includes operating the vehicle along the travel route using the calibration set discussed at step 920.

Thus, discussed herein a method may comprise in response to receiving a travel request at a controller of a vehicle, determining a plurality of potential travel routes for the travel request. The method may further include querying a powertrain calibration database to identify a plurality of travel routes that are similar to the plurality of potential travel routes, where the plurality of travel routes are associated with a plurality of powertrain calibrations. The method may further include mutually evaluating the plurality of potential travel routes and the plurality of powertrain calibrations to coincidentally select a travel route and a powertrain calibration that fulfills the travel request. The method may further include operating the vehicle along the travel route using the powertrain calibration selected for the travel route.

In such a method, travel routes similar to the plurality of potential travel routes may include travel routes within a threshold distance of the plurality of potential travel routes, within a threshold elevation change of the plurality of potential travel routes, and where an inferred vehicle speed for the plurality of potential travel routes is similar to a vehicle speed associated with the plurality of travel routes.

In such a method, determining the plurality of potential travel routes may be based on one or more parameters associated with the travel request, the one or more preferences pertaining to ride quality, travel time, vehicle performance, fuel usage, geographical location and emissions.

In such a method, determining the plurality of potential travel routes may include receiving the plurality of potential travel routes along with the travel request, or developing the plurality of potential travel routes in response to receiving the travel request.

In such a method, mutually evaluating the plurality of potential travel routes and the plurality of powertrain calibrations may include assigning a weight to potential travel route and powertrain calibration pairs. In such an example, selecting the travel route and the powertrain calibration that fulfills the travel request may be based on the weight assigned to the potential travel route and powertrain calibration pairs. Thus, method 900 depicts an example process flow for how a vehicle controller may select a particular powertrain calibration for a particular route. By generating new calibrations, or in other words, new calibration sets, corresponding to particular routes, the calibration database may be populated with additional route and powertrain calibration combinations, which may be useful with regard to the methods of FIG. 6 and FIG. 8, for example. In some examples, while not specifically referred to above with regard to FIG. 9, the method of FIG. 9 for selecting powertrain calibration and route combinations may include taking into account insights learned over time based on data acquired while the vehicle is traveling along different routes using different powertrain calibrations. For example, when a vehicle selects a particular powertrain calibration and route combination, the controller may collect data pertaining to how well the particular calibration works with regard to relevant parameters along the route. As one example, such data may relate to fuel usage along a route where fuel economy is prioritized. As another example, such data may relate to NVH levels associated with a route where a reduction in NVH levels is prioritized. As yet another example, such data may relate to emissions levels along a route where a particular calibration corresponds to stringent emissions parameters. The collected data may be analyzed as discussed, so as to determine the effectiveness of the particular powertrain calibration, and such information may be used when determining new powertrain calibrations as a function of a potential route and/or when analyzing powertrain calibration and route combinations in order to assign particular weights or rankings to the powertrain calibration and route combinations.

Thus, turning now to FIG. 10, an example method 1000 is depicted, detailing a process flow for obtaining data related to how well a particular powertrain calibration is performing with regard to a number of relevant metrics along a particular travel routine. Instructions for carrying out method 1000 and the rest of the methods included herein may be executed by a controller, such as controller 153 of FIG. 1, based on instructions stored in non-transitory memory.

At 1005, method 1000 includes determining whether a vehicle is currently on a trip route where a powertrain calibration has been selected for the particular trip route using any one of the methodologies discussed above. If not, then it may be understood that the vehicle is not in operation, for example, at which point method 1000 ends.

Alternatively, in response to an indication that the vehicle is current traveling a route where the controller has specifically selected a powertrain calibration and travel route combination, method 1000 may proceed to 1010. At 1010, method 1000 includes collecting data pertaining to various parameters related to the powertrain calibration for the route. Such data collection has been briefly mentioned above and will again be briefly discussed. As examples, data collection may refer to fuel usage along the route, for assessing fuel economy parameters. Data collection may refer to NVH levels for assessing ride quality parameters. Data collection may refer to emissions levels for assessing geographical location parameters related to emissions. Data collection may refer to vehicle performance metrics (e.g. acceleration and deceleration metrics, fuel usage metrics, engine knock metrics, air-fuel ratio metrics, etc.) for assessing performance parameters. It may be understood that during a travel routine, such information may be collected via sensors including but not limited to the sensors of the vehicle propulsion system depicted at FIG. 1.

Proceeding to 1015, method 1000 includes indicating whether the particular trip routine is complete. For example, if the vehicle has not reached the specified destination, then it may be understood that the trip routine is not complete, and data may continue to be collected at step 1010. Alternatively, if the vehicle has reached the destination, then it may be determined that the trip is complete and method 1000 may proceed to 1015.

Proceeding to 1020, method 1000 includes evaluating the performance of the calibration with respect to the route. For the evaluating, the vehicle controller may assess how well various metrics were met based on the powertrain calibration. For example, if fuel economy was prioritized to achieve a certain fuel economy but for the particular route fuel economy was degraded compared to the desired fuel economy, then the controller may indicate that the calibration was not optimal for the particular route characteristics. Similar reasoning applies to other aspects of powertrain calibrations along particular routes. For example, if NVH reduction was prioritized but data points to NVH levels being outside of a range associated with the NVH reduction, then it may be determined that the calibration was not an optimal calibration for NVH reduction for the particular route characteristics.

In some examples, machine learning and/or artificial intelligence approaches may be used in combination with the above-mentioned sort of data analysis, to determine broader trends in terms of powertrain calibration evaluation. Such machine learning and/or artificial intelligence methods may use the data obtained for any number of powertrain and route combinations, in order to determine non-obvious trends in terms of powertrain calibration parameters and travel routine parameters that may be then used by the controller to suggest particular powertrain calibrations and travel routine combinations based on associated customer/user preferences. Such data may be additionally or alternatively useful in terms of improving the analysis as discussed above with regard to FIG. 6 and FIG. 8 for assigning weights or rankings to various powertrain and route combinations.

At 1025, method 1000 includes continually updating the calibration database based on the results obtained from the evaluation of collected data as discussed with regard to step 1020. Method 1000 may then end.

In this way, powertrain calibration and travel route combinations may be developed in a mutually dependent manner that accounts for starting and ending locations pertaining to a travel request, along with customer/user preferences associated with the travel request. By pairing travel routes and powertrain calibrations in this manner, it may be possible to more effectively satisfy various preferences for a travel request in a manner compliant with local emissions requirements.

The technical effect of pairing a powertrain calibration and travel route combination in a mutually dependent manner is to enable a most appropriate travel route and powertrain calibration combination for satisfying one or more preferences associated with a travel request. If such an approach were not utilized, then there may be inherent tradeoffs manifested when pairing a powertrain calibration with a route. Instead, by determining powertrain calibrations and travel routes in a mutually dependent manner, closer adherence to the preferences associated with a travel request may be attained.

The systems and methods discussed herein may enable one or more systems and one or more methods. In one example, a method comprises receiving a travel request at a controller of a vehicle; via the controller, coincidentally determining a travel route and a powertrain calibration for the travel route in a mutually dependent manner from a plurality of potential travel routes and a plurality of powertrain calibrations; and operating the vehicle according to the powertrain calibration along the travel route. In a first example of the method, the method further includes wherein the plurality of powertrain calibrations pertain to powertrain calibrations associated with routes previously traveled by the vehicle. A second example of the method optionally includes the first example, and further includes wherein the vehicle is part of a vehicle-for-hire program; and wherein the travel request is communicated to the controller of the vehicle by way of a fleet management system that receives the travel request from a customer, selects the vehicle for fulfilling the travel request, and sends the travel request to the vehicle controller. A third example of the method optionally includes any one or more or each of the first through second examples, and further includes wherein the plurality of potential travel routes are received at the vehicle controller from the fleet management system. A fourth example of the method optionally includes any one or more or each of the first through third examples, and further includes wherein the travel request includes a starting location and an ending destination. A fifth example of the method optionally includes any one or more or each of the first through fourth examples, and further includes wherein the travel request includes one or more parameters related to fuel economy, vehicle performance, environmental conditions, geographical location, and ride quality; and wherein coincidentally determining the travel route and the powertrain calibration in the mutually dependent manner includes accounting for the one or more parameters related to fuel economy, vehicle performance, environmental conditions, geographical location, and ride quality. A sixth example of the method optionally includes any one or more or each of the first through fifth examples, and further includes wherein the plurality of powertrain calibrations are stored at a powertrain calibration database accessible via the controller of the vehicle. A seventh example of the method optionally includes any one or more or each of the first through sixth examples, and further includes wherein the plurality of potential travel routes are developed by the controller in conjunction with an onboard navigation system. An eighth example of the method optionally includes any one or more or each of the first through seventh examples, and further includes wherein the plurality of powertrain calibrations comprises a subset of powertrain calibrations selected from a larger number of calibrations, the subset selected based on the subset of powertrain calibrations having been previously used for routes similar in terms of one or more characteristics associated with the plurality of potential routes. A ninth example of the method optionally includes any one or more or each of the first through eighth examples, and further includes wherein the vehicle is autonomously operated.

Another example of a method comprises in response to receiving a travel request at a controller of a vehicle, determining a plurality of potential travel routes for the travel request; querying a powertrain calibration database to identify a plurality of travel routes that are similar to the plurality of potential travel routes, where the plurality of travel routes are associated with a plurality of powertrain calibrations; mutually evaluating the plurality of potential travel routes and the plurality of powertrain calibrations to coincidentally select a travel route and a powertrain calibration that fulfills the travel request; and operating the vehicle along the travel route using the powertrain calibration selected for the travel route. A first example of the method further includes wherein travel routes similar to the plurality of potential travel routes include travel routes within a threshold distance of the plurality of potential travel routes, within a threshold elevation change of the plurality of potential travel routes, and where an inferred vehicle speed for the plurality of potential travel routes is similar to a vehicle speed associated with the plurality of travel routes. A second example of the method optionally includes the first example, and further includes wherein determining the plurality of potential travel routes is based on one or more parameters associated with the travel request, the one or more preferences pertaining to ride quality, travel time, vehicle performance, fuel usage, geographical location and emissions. A third example of the method optionally includes any one or more or each of the first through second examples, and further includes wherein determining the plurality of potential travel routes includes receiving the plurality of potential travel routes along with the travel request, or developing the plurality of potential travel routes in response to receiving the travel request. A fourth example of the method optionally includes any one or more or each of the first through third examples, and further includes wherein mutually evaluating the plurality of potential travel routes and the plurality of powertrain calibrations includes assigning a weight to potential travel route and powertrain calibration pairs; and wherein selecting the travel route and the powertrain calibration that fulfills the travel request is a based on the weight assigned to the potential travel route and powertrain calibration pairs.

An example of a system for a vehicle comprises a powertrain calibration database that stores a plurality of travel routes and associated powertrain calibrations; and a controller with computer readable instructions stored on non-transitory memory that when executed, cause the controller to: receive a transportation request; determine a plurality of potential travel routes for the transportation request; identify a subset of travel routes from the plurality of travel routes that are similar to the plurality of potential routes; compare powertrain calibrations corresponding to the subset of travel routes with each of the plurality of potential travel routes in order to mutually assign a ranking to powertrain calibration and travel route pairs; select a powertrain calibration and a travel route based on the ranking; and operate the vehicle via the powertrain calibration along the travel route.

In a first example of the system, the system further comprises a route learning module; and wherein the controller stores further instructions to update the powertrain calibration database based on information related to travel routines and associated powertrain calibrations learned over time in conjunction with the route learning module. A second example of the system optionally includes the first example, and further comprises an onboard navigation system; and wherein the controller stores further instructions to develop the plurality of potential travel routes based on the travel request and in conjunction with the onboard navigation system. A third example of the system optionally includes any one or more or each of the first through second examples, and further comprises an autonomous control system that is used for autonomously operating the vehicle along the travel route. A fourth example of the system optionally includes any one or more or each of the first through third examples, and further comprises a software application that receives the transportation request, the transportation request including a starting location and an ending location along with one or more preferences related to the transportation request; and wherein the controller stores further instructions to receive the transportation request from the software application.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
receiving a travel request at a controller of a vehicle;
via the controller,
comparing a plurality of powertrain calibrations corresponding to a set of travel routes with each of a plurality of potential travel routes to mutually assign a ranking to powertrain calibration and travel route pairs, the set of travel routes being similar to the plurality of potential travel routes and are selected from a plurality of travel routes;
coincidentally determining a travel route and a powertrain calibration for the travel route based on the ranking; and
operating the vehicle according to the powertrain calibration along the travel route.

2. The method of claim 1, wherein the plurality of powertrain calibrations pertain to powertrain calibrations associated with routes previously traveled by the vehicle.

3. The method of claim 1, wherein the vehicle is part of a vehicle-for-hire program; and
wherein the travel request is communicated to the controller of the vehicle by way of a fleet management system that receives the travel request from a customer, selects the vehicle for fulfilling the travel request, and sends the travel request to the vehicle controller.

4. The method of claim 3, wherein the plurality of potential travel routes are received at the vehicle controller from the fleet management system.

5. The method of claim 1, wherein the travel request includes a starting location and an ending destination.

6. The method of claim 1, wherein the travel request includes one or more parameters related to fuel economy, vehicle performance, environmental conditions, geographical location, and ride quality; and
wherein comparing a plurality of powertrain calibrations corresponding to a set of travel routes with each of a plurality of potential travel routes includes accounting for the one or more parameters related to fuel economy, vehicle performance, environmental conditions, geographical location, and ride quality.

7. The method of claim 1, wherein the plurality of powertrain calibrations are stored at a powertrain calibration database accessible via the controller of the vehicle.

8. The method of claim 1, wherein the plurality of potential travel routes are developed by the controller in conjunction with an onboard navigation system.

9. The method of claim 1, wherein the plurality of powertrain calibrations comprises a subset of powertrain calibrations selected from a larger number of calibrations, the subset selected based on the subset of powertrain calibrations having been previously used for routes similar in terms of one or more characteristics associated with the plurality of potential routes.

10. The method of claim 1, wherein the vehicle is autonomously operated.

11. A method comprising:
in response to receiving a travel request at a controller of a vehicle, determining a plurality of potential travel routes for the travel request;
querying a powertrain calibration database to identify a plurality of travel routes that are similar to the plurality of potential travel routes, where the plurality of travel routes are associated with a plurality of powertrain calibrations;
mutually evaluating the plurality of potential travel routes and the plurality of powertrain calibrations to coincidentally select a travel route and a powertrain calibration that fulfills the travel request; and
operating the vehicle along the travel route using the powertrain calibration selected for the travel route,
wherein mutually evaluating the plurality of potential travel routes and the plurality of powertrain calibrations includes assigning a weight to potential travel route and powertrain calibration pairs; and
wherein selecting the travel route and the powertrain calibration that fulfills the travel request is a based on the weight assigned to the potential travel route and powertrain calibration pairs.

12. The method of claim 11, wherein travel routes similar to the plurality of potential travel routes include travel routes within a threshold distance of the plurality of potential travel routes, within a threshold elevation change of the plurality of potential travel routes, and where an inferred vehicle speed for the plurality of potential travel routes is similar to a vehicle speed associated with the plurality of travel routes.

13. The method of claim 11, wherein determining the plurality of potential travel routes is based on one or more parameters associated with the travel request, the one or more preferences pertaining to ride quality, travel time, vehicle performance, fuel usage, geographical location and emissions.

14. The method of claim 11, wherein determining the plurality of potential travel routes includes receiving the plurality of potential travel routes along with the travel request, or developing the plurality of potential travel routes in response to receiving the travel request.

15. A system for a vehicle, comprising:
a powertrain calibration database that stores a plurality of travel routes and associated powertrain calibrations; and
a controller with computer readable instructions stored on non-transitory memory that when executed, cause the controller to:
receive a transportation request;
determine a plurality of potential travel routes for the transportation request;
identify a subset of travel routes from the plurality of travel routes that are similar to the plurality of potential routes;
compare powertrain calibrations corresponding to the subset of travel routes with each of the plurality of potential travel routes in order to mutually assign a ranking to powertrain calibration and travel route pairs;
select a powertrain calibration and a travel route based on the ranking; and
operate the vehicle via the powertrain calibration along the travel route.

16. The system of claim 15, further comprising a route learning module; and
wherein the controller stores further instructions to update the powertrain calibration database based on information related to travel routines and associated powertrain calibrations learned over time in conjunction with the route learning module.

17. The system of claim 15, further comprising an onboard navigation system; and
wherein the controller stores further instructions to develop the plurality of potential travel routes based on the travel request and in conjunction with the onboard navigation system.

18. The system of claim 15, further comprising an autonomous control system that is used for autonomously operating the vehicle along the travel route.

19. The system of claim 15, further comprising a software application that receives the transportation request, the transportation request including a starting location and an ending location along with one or more preferences related to the transportation request; and
wherein the controller stores further instructions to receive the transportation request from the software application.

* * * * *